US012516456B2

United States Patent
Lund et al.

(10) Patent No.: US 12,516,456 B2
(45) Date of Patent: *Jan. 6, 2026

(54) SELECTIVE LASER BONDING ON TEXTILES

(71) Applicant: NIKE, Inc., Beaverton, OR (US)

(72) Inventors: Dallas Lund, Portland, OR (US); David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/197,626

(22) Filed: May 15, 2023

(65) Prior Publication Data

US 2023/0366138 A1 Nov. 16, 2023

Related U.S. Application Data

(60) Provisional application No. 63/342,430, filed on May 16, 2022.

(51) Int. Cl.
*D04H 1/541* (2012.01)
*D04H 1/559* (2012.01)
*D06M 10/00* (2006.01)

(52) U.S. Cl.
CPC ........... *D04H 1/5418* (2020.05); *D04H 1/559* (2013.01); *D06M 10/005* (2013.01); *D10B 2501/00* (2013.01)

(58) Field of Classification Search
CPC ... D04H 1/5418; D04H 1/559; D06M 10/005; D10B 2501/00
See application file for complete search history.

(56) References Cited

U.S. PATENT DOCUMENTS

| 4,657,957 A | 4/1987 | Baumann et al. |
| 5,102,724 A | 4/1992 | Okawahara et al. |
| 5,252,158 A | 10/1993 | Shimizu et al. |
| 5,288,348 A | 2/1994 | Modrak |
| 5,993,586 A | 11/1999 | Dunson et al. |
| 7,722,743 B2 | 5/2010 | Best et al. |

(Continued)

FOREIGN PATENT DOCUMENTS

| AU | 48933/93 A | 1/1994 |
| CN | 1050749 A | 4/1991 |

(Continued)

OTHER PUBLICATIONS

International Search Report and Written Opinion received for PCT Patent Application No. PCT/US2023/022360, mailed on Sep. 6, 2023, 13 pages.

(Continued)

*Primary Examiner* — Jeremy R Pierce
(74) *Attorney, Agent, or Firm* — Shook, Hardy & Bacon L.L.P.

(57) ABSTRACT

Electromagnetic radiation is applied (e.g., by a laser) to a nonwoven textile comprising first fibers having a first propensity to absorb the electromagnetic radiation and second fibers having a second propensity to absorb the electromagnetic radiation that is lower than the first propensity. The electromagnetic radiation may be used to form discrete bonding structures within the volume of the nonwoven textile, wherein the bonding structures are generally absent from the faces of the nonwoven textile.

9 Claims, 14 Drawing Sheets

(56) References Cited

U.S. PATENT DOCUMENTS

| | | | |
|---|---|---|---|
| 8,138,449 | B2 | 3/2012 | Matsuo et al. |
| 8,172,970 | B2 | 5/2012 | Sussmann |
| 8,415,007 | B2 | 4/2013 | Honma et al. |
| 9,192,212 | B2 | 11/2015 | Tateishi et al. |
| 9,248,622 | B2 | 2/2016 | Määttä et al. |
| 9,642,751 | B2 | 5/2017 | Imai et al. |
| 9,765,481 | B2 | 9/2017 | Malmquist et al. |
| 9,903,070 | B2 | 2/2018 | Mourad et al. |
| 10,800,349 | B2 | 10/2020 | Nakagawa |
| 10,981,095 | B2 | 4/2021 | Konishi |
| 2002/0164465 | A1* | 11/2002 | Curro .................. D04H 1/559 442/361 |
| 2003/0119413 | A1* | 6/2003 | Chakravarty ....... D06M 10/003 428/340 |
| 2005/0003721 | A1 | 1/2005 | Greulich et al. |
| 2006/0286362 | A1* | 12/2006 | Kubota .................. C08J 5/04 428/297.4 |
| 2007/0123131 | A1 | 5/2007 | Nguyen et al. |
| 2010/0075120 | A1 | 3/2010 | Gustafsson et al. |
| 2010/0093241 | A1 | 4/2010 | Medoff |
| 2011/0311795 | A1 | 12/2011 | Bartl et al. |
| 2013/0034680 | A1 | 2/2013 | Manninen |
| 2016/0175751 | A1 | 6/2016 | Chhabra et al. |
| 2017/0043567 | A1 | 2/2017 | Gubler et al. |
| 2018/0079142 | A1 | 3/2018 | Kinzelmann et al. |
| 2020/0157734 | A1 | 5/2020 | Creighton et al. |
| 2022/0275580 | A1* | 9/2022 | Eberhardt ............ D04H 1/5418 |
| 2022/0282402 | A1 | 9/2022 | Kobayashi et al. |

FOREIGN PATENT DOCUMENTS

| | | |
|---|---|---|
| CN | 1940161 A | 4/2007 |
| CN | 107106957 A | 8/2017 |
| CN | 114245833 A | 3/2022 |
| CN | 114450444 A | 5/2022 |
| DE | 3807859 A1 | 9/1989 |
| DE | 10200208 A1 | 7/2003 |
| EP | 0472942 A1 | 3/1992 |
| GB | 1463370 A | 2/1977 |
| JP | 2019-019430 A | 2/2019 |
| WO | 2012/114831 A1 | 8/2012 |
| WO | 2016/092208 A1 | 6/2016 |
| WO | 2017/168172 A1 | 10/2017 |
| WO | 2019/095423 A1 | 5/2019 |
| WO | 2021/058536 A1 | 4/2021 |
| WO | 2022/093594 A2 | 5/2022 |

OTHER PUBLICATIONS

Laser Joining Fabrics Improves Productivity, Laser Focus World, Available online at <https://www.laserfocusworld.com/industrial-laser-solutions/article/14216338/laser-Joining-fabrics-improves-productivity>, Accessed on Dec. 20, 2021, Jan. 1, 2005, 11 pages.

Mcgrath, Gareth, "Improving Productivity And Quality With Laser Seaming of Fabrics", Fibre 2 Fashion, Available online at <https://www.fibre2fashion.com/industry-article/1368/improving-productivity-and-quality-with-laser-seaming-of-fabrics>, Accessed on Mar. 3, 2021, Jan. 2007, 4 pages.

Vasquez, Joshua, "Defocused Laser Welding Fabric Proves There's Many Ways To Slice It", Hackaday, Available online at <https://hackaday.com/2020/04/27/defocused-laser-welding-fabric-proves-theres-many-ways-to-slice-it/>; Accessed on Apr. 28, 2020, Apr. 27, 2020, 7 pages.

\* cited by examiner

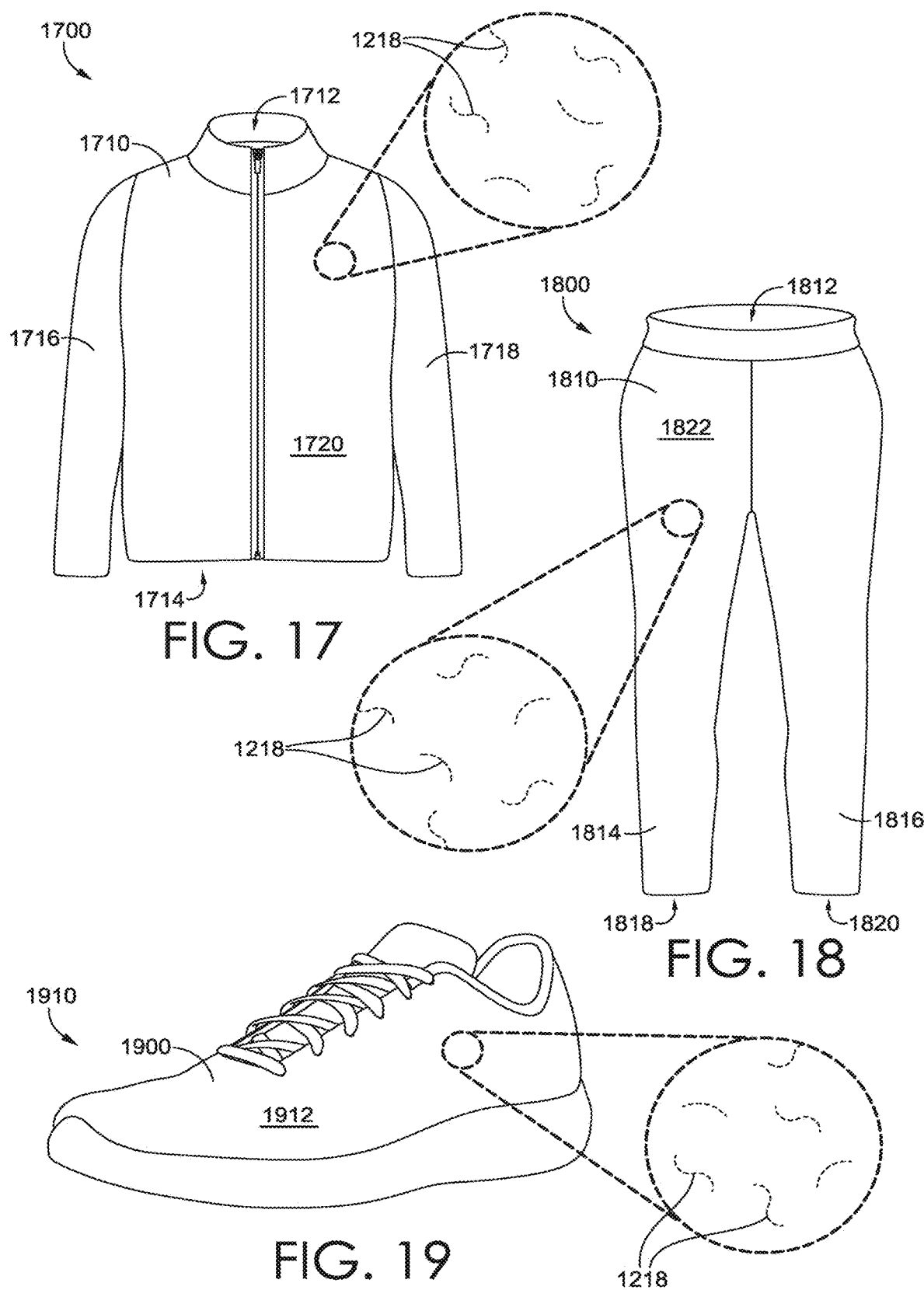

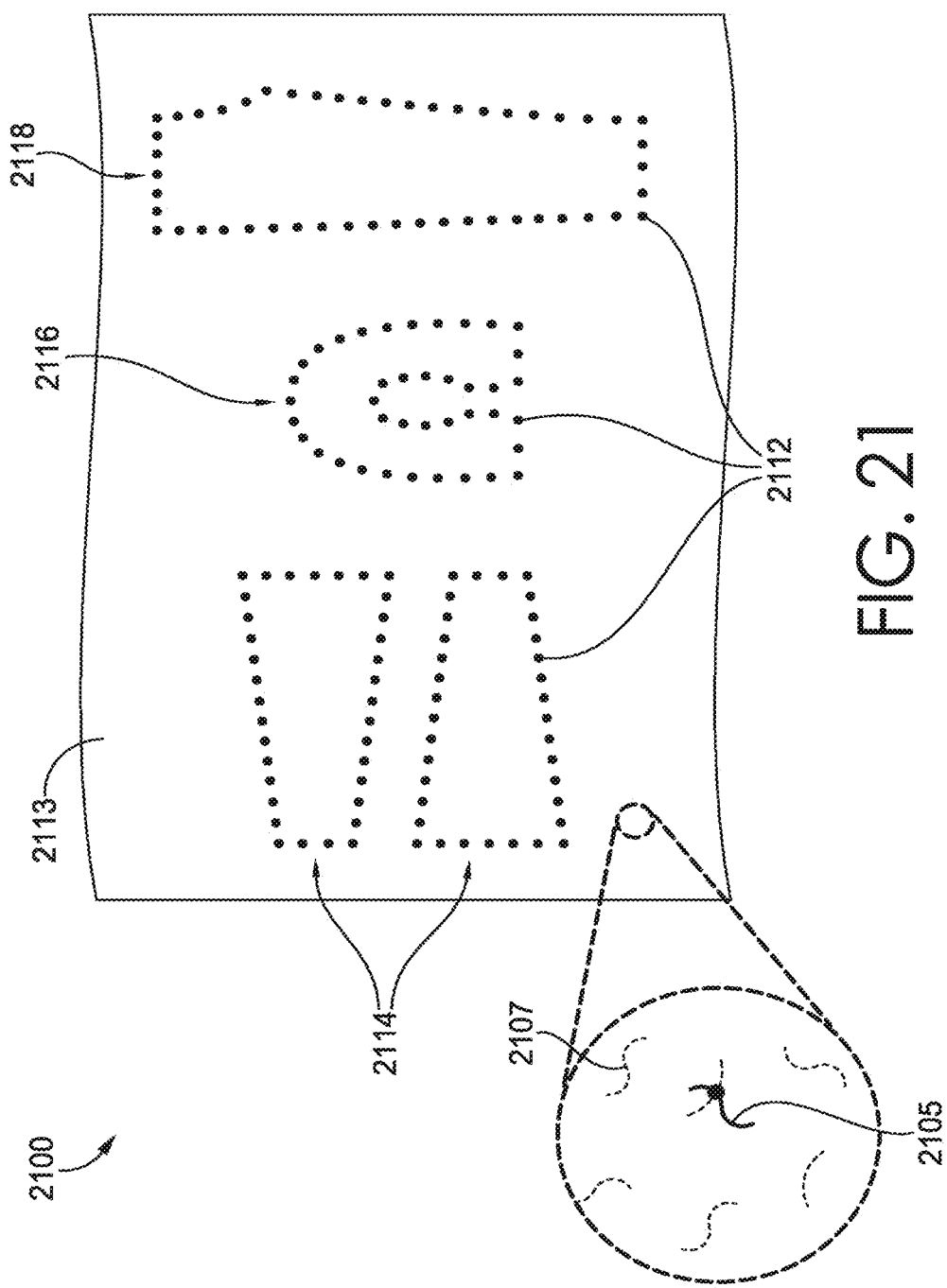

SELECTIVE LASER BONDING ON TEXTILES

CROSS REFERENCE TO RELATED APPLICATIONS

This application claims the priority benefit of U.S. Provisional Application No. 63/342,430 (filed May 16, 2022), which is incorporated herein by reference in its entirety.

TECHNICAL FIELD

Aspects herein relate to creating bonding structures within a volume of a nonwoven material to reduce pilling and/or to affix two or more nonwoven textiles to each other.

BACKGROUND

Because nonwovens are generally formed using fibers, fiber ends may migrate through a face of the nonwoven and entangle with other fiber ends to form pills. Although pilling may be reduced by treating the face of the nonwoven with different processes such as calendaring and/or with different materials including adhesive-type materials to adhere together the fiber ends, the all-over surface treatment may impact the face of nonwoven by, for example, potentially reducing the softness or hand of the nonwoven and also may impact the drapability of the nonwoven. This may be less than desirable when the nonwoven is used in articles of apparel where a soft hand and drapability are desirable characteristics.

Moreover, traditional processes for securing nonwoven webs or textiles together include, for example, using adhesives or films, stitching, entangling, and the like. Although these processes may be effective securing mechanisms, they may increase manufacturing costs, increase the carbon footprint associated with manufacturing, and/or may reduce the recyclability of the resulting composite nonwoven textile due to the use of disparate materials such as, for example, adhesives, films, or threads used for stitching.

BRIEF DESCRIPTION OF THE DRAWINGS

Examples of aspects herein are described in detail below with reference to the attached drawing figures, wherein:

FIG. 17 illustrates an example upper-body garment formed from the composite nonwoven textile of FIG. 12 in accordance with aspects herein;

FIG. 18 illustrates an example lower-body garment formed from the composite nonwoven textile of FIG. 12 in accordance with aspects herein;

FIG. 19 illustrates an example upper for an article of footwear formed from the composite nonwoven textile of FIG. 12 in accordance with aspects herein;

FIG. 21 illustrates an example nonwoven textile having laser bonding sites to demarcate pattern pieces in accordance with aspects herein;

DETAILED DESCRIPTION

Figure 1:
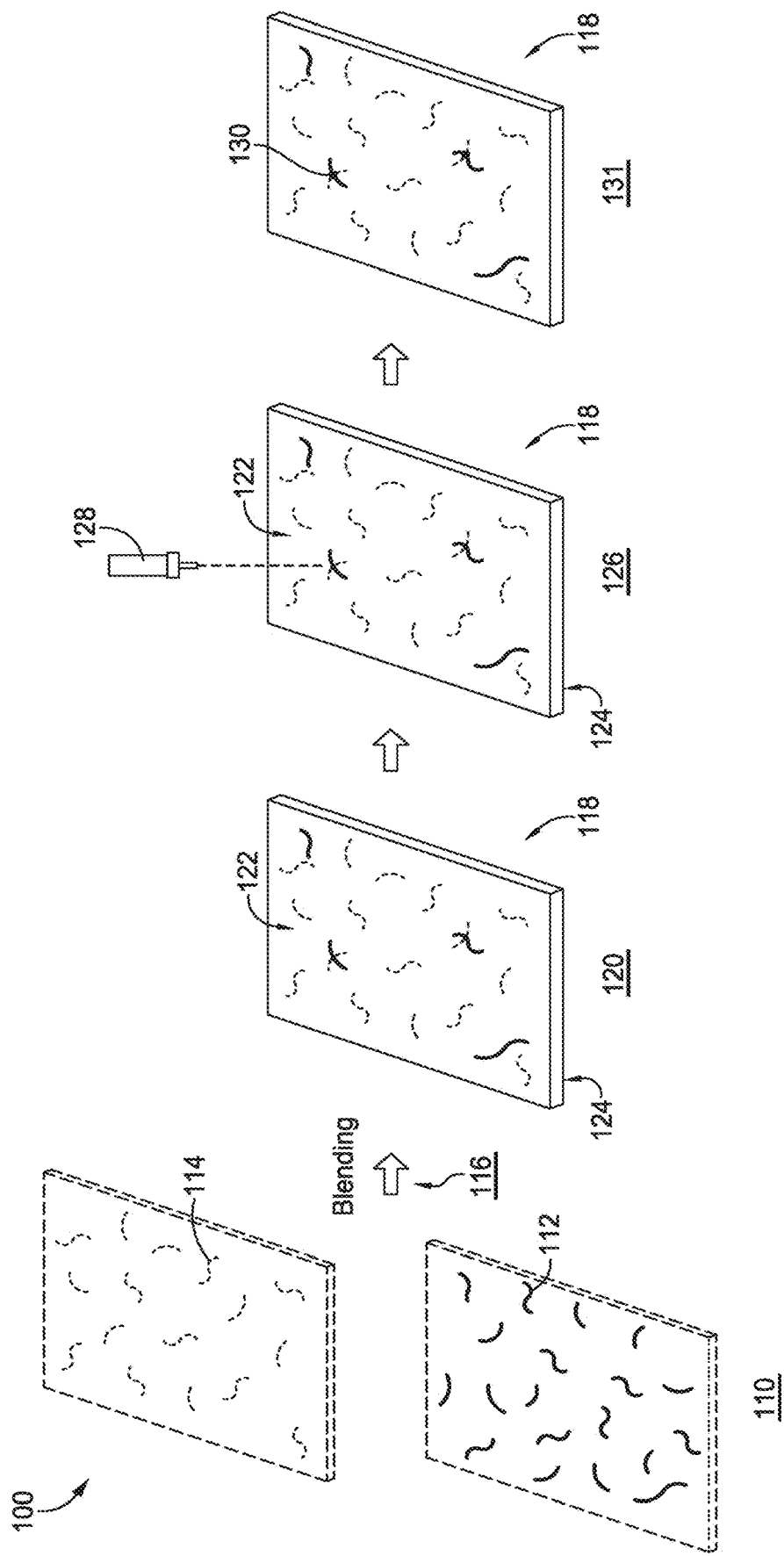
FIG. 1 illustrates a schematic of an example process of finishing a nonwoven textile to reduce pilling in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Because nonwovens are generally formed using fibers, fiber ends may migrate through a face of the nonwoven and entangle with other fiber ends to form pills. Although pilling may be reduced by treating the face of the nonwoven with different processes such as calendaring and/or with different materials including adhesive-type materials to adhere together the fiber ends, the all-over surface treatment may impact the face of nonwoven by, for example, potentially reducing the softness or hand of the nonwoven and also may impact the drapability of the nonwoven. This may be less than desirable when the nonwoven is used in articles of apparel where a soft hand and drapability are desirable characteristics.

Moreover, traditional processes for securing nonwoven webs or textiles together include, for example, using adhesives or films, stitching, entangling, and the like. Although these processes may be effective securing mechanisms, they may increase manufacturing costs, increase the carbon footprint associated with manufacturing, and/or may reduce the recyclability of the resulting composite nonwoven textile due to the use of disparate materials such as, for example, adhesives, films, or threads used for stitching.

At a high level, aspects herein are directed to using electromagnetic radiation emitted by a laser (or some other bonding technique) to create discrete, spaced-apart bonding structures within an interior volume of a nonwoven textile while minimally impacting the faces of the nonwoven textile. Stated differently, in example aspects, the bonding structures can be primarily positioned between a first face and an opposite second face of the nonwoven textile and within the interior volume of the nonwoven textile. In some examples, the bonding structures can be on at least one of the faces. The bonding structures help to secure fibers and/or fiber ends thereby reducing the possibility of the fiber ends migrating through the faces of the nonwoven textile and forming pills. In at least some examples, the bonding structures can be formed via application of the laser alone. In at least some examples, the bonding structures can be formed via application of the laser together with one or more other techniques for creating bonding structures (e.g., via application of an adhesive, thermal bonding by melting at least some of the fibers, etc.).

In examples involving a laser, creating bonding structures can be accomplished by selectively mixing or entangling fibers that have different propensities for absorbing the electromagnetic radiation emitted by the laser. For example, a first plurality of fibers having a relatively greater propensity to absorb the electromagnetic radiation emitted by the laser may be selectively mixed or entangled with a second plurality of fibers having a relatively lower propensity for absorbing the electromagnetic radiation emitted by the laser to produce a non-homogenous mixture of the first and second pluralities of fibers. In example aspects, one or more of the first plurality of fibers and the second plurality of fibers comprise a polymer. In example aspects, the second plurality of fibers may be positioned at or more toward the first face and the first plurality of fibers may be positioned at or more toward the second face. Both the first and second pluralities of fibers may be present in the interior volume of the nonwoven textile where the fibers are in contact with each other and/or are located closely adjacent to each other.

Electromagnetic radiation emitted by a laser of a specified wavelength or wavelength range may be directed at the first face of the nonwoven textile. Because the first face primarily comprises the second plurality of fibers that have a relatively lower propensity to absorb the wavelength of the electromagnetic radiation emitted by the laser, the electromagnetic radiation passes into the volume of the nonwoven textile where it is absorbed by one or more of the first plurality of fibers. The electromagnetic radiation causes portions of the first plurality of fibers to melt. When the laser ceases emitting the electromagnetic radiation, the melted portions of the first plurality of fibers re-solidify to form amorphous polymer agglomerates. The amorphous polymer agglomerates may encapsulate or partially encapsulate adjacent fibers from the first and/or second pluralities of fibers thereby trapping these fibers and generally minimizing migration of fibers and fiber ends from both the first plurality of fibers and the second plurality of fibers to reduce pilling or increase the resistance to pilling at the faces of the nonwoven textile. This is accomplished without substantively impacting the fibers present on one or more of the faces of the nonwoven textile. Thus, these fibers maintain their desired characteristics such as softness, abrasion resistance, and the like. The nonwoven textile may be subsequently used to form articles of apparel such as upper-body garments, lower-body garments, uppers for articles of footwear, articles of headwear, and the like.

Example aspects herein further contemplate using laser bonding to create a composite nonwoven textile. In example aspects, a surface of a first web of fibers formed of first fibers having a relatively greater propensity to absorb electromagnetic radiation of a specified wavelength may be positioned adjacent to a surface of a second web of fibers formed from second fibers having a relatively lower propensity to the absorb electromagnetic radiation; one or more of the first fibers and the second fibers comprise a polymer. Electromagnetic radiation emitted by a laser of the specified wavelength or wavelength range may be directed toward the second web of fibers. Because the second fibers forming the second web have a relatively lower propensity to absorb the electromagnetic radiation emitted by the laser, the electromagnetic radiation passes into the interior volume of the stacked webs. At the interface between the first and second webs of fibers, the electromagnetic radiation is absorbed by one or more of the first fibers causing portions of the first fibers to melt. When the laser ceases emitting the electromagnetic radiation, the melted portions of the first fibers re-solidify to form amorphous polymer agglomerates. The amorphous polymer agglomerates may encapsulate or partially encapsulate adjacent fibers from the first fibers and/or the second fibers thereby trapping these fibers and creating bonds between the first and second webs of fibers to form a composite nonwoven textile. This process may be used in combination with the above process to create a composite nonwoven textile with an increased resistance to pilling. Again, because the bonding structures are positioned within the interior volume of the composite nonwoven textile, the fibers on the faces of the composite nonwoven textile are largely unaffected such that they retain their desired characteristics. The composite nonwoven textile may be subsequently used to form articles of apparel such as upper-body garments, lower-body garments, uppers for articles of footwear, articles of headwear, and the like.

Electromagnetic radiation emitted by a laser may be used in additional ways with nonwoven textiles. For example, electromagnetic radiation emitted by a laser may be used to excise pattern pieces from a nonwoven textile that comprises fibers that absorb the electromagnetic radiation. In an alternative aspect, electromagnetic radiation emitted by a laser may be used to create markings that delineate the perimeter or shape of the pattern piece. The pattern piece may be subsequently excised from the nonwoven textile using, for example, traditional cutting technologies and used to construct articles of apparel.

In another example, electromagnetic radiation emitted by a laser may be used to increase the drapability or drape of a nonwoven textile. In one example, bonding structures located within the volume of the nonwoven textile may cause depressions or dimples in one or more of the faces of a nonwoven textile due to entrapment of fibers within the bonding structures, where the entrapped fibers may exert tension on fibers with which they are entangled. The dimples are axially aligned with the bonding structures located within the volume of the nonwoven textile. The dimples decrease the loft and/or thickness of the nonwoven textile in the areas in which they are located. By selectively positioning the bonding structures, a pattern of dimples may be formed in one or more of the faces of the nonwoven textile. The pattern of dimples may be used to create fold lines for improved drape.

In another example, electromagnetic radiation emitted by a laser may be used to create graphics, logos, or letters on a nonwoven textile. This may be useful, for example, in generating care instructions for an article of apparel formed from a nonwoven textile which eliminates the need to attach separate care instruction labels to the article of apparel. In this example, at least some of the fibers forming a first face of the nonwoven textile may comprise a material that changes color when exposed to electromagnetic radiation emitted by a laser. One example material may be titanium dioxide ($TiO_2$). Electromagnetic radiation emitted by the laser may be applied to the first face in a predefined pattern. The $TiO_2$ fibers that are exposed to the electromagnetic radiation change color from a first color to a second color (e.g., change from white to grey) and thus an image is formed that corresponds to the pattern of the electromagnetic radiation application.

In general, the aspects described above lower the overall carbon footprint of the nonwoven textile and may also improve the recyclability of the textile. For example, using laser bonding to increase resistance to pilling reduces and possible eliminates (in some instances) the need for surface treatments which may improve the recyclability of the textile. Using laser bonding to create bonds between webs of fibers may eliminate the need for using other affixing methods such as stitching, use of adhesives or films, and the like, which reduces the carbon footprint of the textile and also increases its recyclability. Other aspects described herein, such as use of $TiO_2$ fibers to generate care instructions for nonwoven articles of apparel eliminates the need for application of care labels which reduces manufacturing costs, reduces the carbon footprint, and increases the recyclability of the textile.

In some examples, a nonwoven textile can be treated (e.g., to reduce pilling) by applying an adhesive to form one or more chemical bonding sites/structures for capturing a fiber to reduce fiber migration. For example, a rotogravure system can be adapted to apply a chemical binder to the a nonwoven textile to reduce the formation of pills on one or more surfaces of the nonwoven textile. In example aspects, the chemical binder may be applied to one or more of the webs of fibers (e.g., before the webs are incorporated into the composite nonwoven textile). In other examples, the chemical binder may be applied to the finished composite nonwoven textile (e.g., the composite nonwoven textile after the individual webs have been stacked and entangled with each other). In this aspect, because the fibers have been entangled with each other, when the chemical binder is applied to, for example, the one of the outer faces, the chemical binder may bond together, for example, one or more of the fibers that are present on the first face and/or may flow into the central volume to bond together fibers between the faces.

As used herein, the term "chemical bonding" refers to the use of chemical binders (e.g., adhesive materials) that are used to hold fibers together. The chemical binder joins fibers together at fiber intersections and fiber bonding results. In one example aspect, the chemical binder may form an adhesive film the bonds the fibers together at, for example, fiber intersections. Because the fibers are adhered together, the terminal ends of the fibers are less prone to migration and pilling and the overall pilling resistance of at least the one of the faces of the composite nonwoven textile is increased. Suitable chemical binders include those that comprise polymers and may include vinyl polymers and copolymers, acrylic ester polymers and copolymers, rubber and synthetic rubber, and natural binders such as starch. The chemical binder may be applied in an aqueous dispersion, an oil-based dispersion, a foam dispersion, and the like. In example aspects, a base coating or primer may be applied to the composite nonwoven textile before application of the chemical binder. In one example aspect, the chemical binder may include an oil-based polyurethane binder. The term "chemical bonding site," as used herein refers to the location of the chemical bond and it furthers refers to the chemical binder itself as applied to the composite nonwoven textile at In some examples, a nonwoven textile can be treated by applying thermal bonding. As used herein, the term "thermal bonding" refers to a process that may include locally heating fibers to melt, partially melt, and/or soften the fibers. This permits polymer chain relaxation and diffusion or polymer flow across fiber-fiber interfaces between two crossing fibers. Subsequent cooling of the fibers causes them to re-solidify and to trap the polymer chain segments that diffused across the fiber-fiber interfaces. The thermal bonds trap the terminal ends of the fibers and makes the fibers ends less prone to interacting with other fiber ends to form pills. As used herein, the term "thermal bonding site," refers to the location of the thermal bond on the composite nonwoven textile, and the term "thermal bond structure" refers to the actual structure formed by the re-solidified fibers and/or materials and typically includes fibers and materials from the different webs of fibers used to form the composite nonwoven textile.

As used herein, the term "article of apparel" is intended to encompass articles worn by a wearer. As such, they may include upper-body garments (e.g., tops, t-shirts, pullovers, hoodies, jackets, coats, and the like), and lower-body garments (e.g., pants, shorts, tights, capris, unitards, and the like). Articles of apparel may also include hats, gloves, sleeves (arm sleeves, calf sleeves), articles of footwear such as uppers for shoes, and the like. The term "inner-facing surface" when referring to the article of apparel means the surface that is configured to face towards a body surface of a wearer, and the term "outer-facing surface" means the surface that is configured to face opposite of the inner-facing surface, away from the body surface of the wearer, and toward an external environment. The term "innermost-facing surface" means the surface closest to the body surface of the wearer with respect to other layers of the article of apparel, and the term "outermost-facing surface" means the surface that is positioned furthest away from the body surface of the wearer with respect to the other layers of the article of apparel.

As used herein, the term "nonwoven textile" refers to fibers that are held together by mechanical and/or chemical interactions without being in the form of a knit, woven, braided construction, or other structured construction. In a particular aspect, the nonwoven textile includes a collection of fibers that are mechanically manipulated to form a mat-like material. Stated differently nonwoven textiles are directly made from fibers. The nonwoven textile may include different webs of fibers formed into a cohesive structure, where the different webs of fibers may have a different or similar composition of fibers and/or different properties. A "web of fibers" as used herein includes fibers that may have undergone a carding and lapping process that generally aligns the fibers in one or more common directions that extend along an x, y plane and that achieves a desired basis weight. The web of fibers may also undergo a mechanical entanglement process that entangles the fibers of the web to a degree such that the web of fibers forms a cohesive structure that can be manipulated (e.g., rolled on to a roller, un-rolled from the roller, stacked, and the like).

Aspects herein contemplate that fibers may be entangled with other fibers. The mechanical entanglement process contemplated herein may include needle entanglement (commonly known as needlepunching) using barbed or structured needles (e.g., forked needles), or fluid entanglement (commonly known as hydroentanglement). Needlepunching generally uses barbed or spiked needles to reposition a percentage of fibers from a generally horizontal orientation (an orientation extending along an x, y plane) to a generally vertical orientation (a z-direction orientation). Barbed needles, which are fixed to a needle board, pass in and out through one or more webs of fibers, and the stripper plate strips the fibers from the needles after the needles have moved in and out of the one or more webs of fibers. The needle board may repeatedly engage and disengage from the one or more webs of fibers as the one or more webs of fibers are moved in a machine direction along a conveyance system such that the length of the one or more webs of fibers are needled. Each engagement of a needle board with the one or more webs of fibers is known herein as a "pass." Parameters associated with particular needle boards may be adjusted to achieve desired properties of the resulting needled nonwoven textile (e.g., basis weight, thickness, and the like). The different parameters may include stitch density (SD) which is the number of needles per $cm^2$ ($n/cm^2$) used during an entanglement pass and penetration depth (PD) which is how far the needle passes through the one or more webs of fibers before being pulled out of the one or more webs of fibers. Parameters associated with the needlepunching process in general may also be adjusted such as the spacing between the bed plate and the stripper plate and the speed of conveyance of the one or more webs of fibers.

Aspects herein contemplate using a barbed needle (a needle having a pre-set number of barbs arranged along a length of the needle) although other needle types are contemplated herein. The barbs on the needle "capture" fibers as the barb moves from a first face to an opposing second face of the one or more webs of fibers. The movement of the needle through the one or more webs of fibers effectively moves or pushes fibers captured by the barbs from a location near or at the first face to a location near or at the second face and further causes physical interactions with other fibers helping to "lock" the moved fibers into place through, for example, friction (commonly known as entanglement). It is also contemplated herein that the needles may pass through the one or more webs of fibers from the second face toward the first face.

Hydroentanglement is similar to needle entanglement except that instead of barbed needles, jets of fluid are used to reposition a percentage of fibers from a generally horizontal orientation (an orientation extending along an x, y plane) to a generally vertical orientation (a z-direction orientation).

The nonwoven textile or the composite nonwoven textile may include a first face and an opposite second face which both face outward with respect to an interior volume of the textile and comprise the outermost faces of the textile. As such, when viewing the textile, the first face and the second face are each fully visible. The first face and the second face may both extend along x, y planes that are generally parallel and offset from each other. For instance, the first face may be oriented in a first x, y plane and the second face may be oriented in a second x, y plane generally parallel to and offset from the first x, y plane.

When referring to fibers, the term denier or denier per fiber is a unit of measure for the linear mass density of the fiber and more particularly, it is the mass in grams per 9000 meters of the fiber. In one example aspect, the denier of a fiber may be measured using ASTM D1577-07. The dtex of a fiber is the mass of an individual fiber in grams per 10,000 meter of fiber length. The diameter of a fiber may be calculated based on the fiber's denier and/or the fiber's dtex. For instance, the fiber diameter, d, in millimeters may be calculated using the formula: d=square root of dtex divided by 100. In general, the diameter of a fiber has a direct correlation to the denier of the fiber (i.e., a smaller denier fiber has a smaller diameter). Fibers contemplated herein may be formed of a number of different materials (e.g., cotton, nylon and the like) including polyethylene terephthalate (PET) commonly known as polyester, which is a polymer material. The PET fibers may include virgin PET fibers (fibers that have not been recycled), and recycled PET fibers. Recycled PET fibers include shredded PET fibers derived from shredded articles and re-extruded PET fibers (fibers that are re-extruded using recycled PET chips).

The term "color" as used herein when referring to, for example, fibers in a nonwoven textile generally refers to an observable color of fibers that form at least portions of the textile. Such aspects contemplate that a color may be any color that may be afforded to fibers using dyes, material deposits, pigments, and/or colorants that are known in the art. As such, fibers may be configured to have a color including, but not limited to red, orange, yellow, green, blue, indigo, violet, white, black, and shades thereof. In one example aspect, the color may be imparted to the fiber when the fiber is formed (commonly known as dope dyeing). In dope dyeing, the color is added to the fiber as it is being extruded such that the color is integral to the fiber and is not added to the fiber in a post-formation step (e.g., through a piece dyeing step).

Aspects related to a color further contemplate determining if one color is different from another color. In these aspects, a color may comprise a numerical color value, which may be determined by using instruments that objectively measure and/or calculate color values of a color of an object by standardizing and/or quantifying factors that may affect a perception of a color. Such instruments include, but are not limited to spectroradiometers, spectrophotometers, and the like. Thus, aspects herein contemplate that a "color" of a textile provided by fibers may comprise a numerical color value that is measured and/or calculated using spectroradiometers and/or spectrophotometers. Moreover, numerical color values may be associated with a color space or color model, which is a specific organization of colors that provides color representations for numerical color values, and thus, each numerical color value corresponds to a singular color represented in the color space or color model.

In these aspects, a color may be determined to be different from another color if a numerical color value of each color differs. Such a determination may be made by measuring and/or calculating a numerical color value of, for instance, a first textile having a first color with a spectroradiometer or a spectrophotometer, measuring and/or calculating a numerical color value of a second textile having a second color with the same instrument (i.e., if a spectrophotometer was used to measure the numerical color value of the first color, then a spectrophotometer is used to measure the numerical color value of the second color), and comparing the numerical color value of the first color with the numerical color value of the second color. In another example, the determination may be made by measuring and/or calculating a numerical color value of a first area of a textile with a spectroradiometer or a spectrophotometer, measuring and/or calculating a numerical color value of a second area of the textile having a second color with the same instrument, and comparing the numerical color value of the first color with the numerical color value of the second color. If the numerical color values are not equal, then the first color or the first color property is different than the second color or the second color property, and vice versa.

Further, it is also contemplated that a visual distinction between two colors may correlate with a percentage difference between the numerical color values of the first color and the second color, and the visual distinction will be greater as the percentage difference between the color values increases. Moreover, a visual distinction may be based on a comparison between colors representations of the color values in a color space or model. For instance, when a first color has a numerical color value that corresponds to a represented color that is black or navy and a second color has a numerical color value that corresponds to a represented color that is red or yellow, a visual distinction between the first color and the second color is greater than a visual distinction between a first color with a represented color that is red and a second color with a represented color that is yellow.

The term "pill" or "pilling" as used herein refers to the formation of small balls of fibers or fibers ends on a facing side of the nonwoven textile. The pill may extend away from a surface plane of the face. Pills are generally formed during normal wash and wear due to forces (e.g., abrasion forces) that cause the fiber ends to migrate through the face of the nonwoven textile and entangle with other fiber ends. A textile's resistance to pilling may be measured using standardized tests such as Random Tumble and Martindale Pilling tests.

Aspects herein discuss the use of lasers to emit electromagnetic radiation that is absorbed by one or more fibers in a nonwoven textile. In general, lasers emit energy in the form of photons having a specific wavelength that is dependent upon the state of an electron's energy when the photon is released. Electromagnetic radiation emitted by a laser is generally monochromatic (i.e., it comprises a specific wavelength), coherent, and directional. In general, the primary wavelengths associated with the electromagnetic radiation fall within the ultraviolet, visible, and infrared regions of the electromagnetic spectrum. For instance, the electromagnetic radiation may have wavelengths between 100 nanometers (nm) and 400 nm (ultraviolet radiation), wavelengths between about 400 nm and 700 nm (visible radiation), and wavelengths between 700 nm and 1 mm (infrared radiation).

When describing that a fiber has a propensity to absorb electromagnetic radiation emitted by a laser, it is contemplated herein that the fiber has properties that enable it to absorb electromagnetic radiation of a specified wavelength or wavelength range.

Aspects herein contemplate use of different types of commercially available lasers including laser diodes, continuous wave lasers, gas lasers, solid-state lasers, pulse lasers such as a femto-second-laser, excimer lasers, semiconductor lasers, dye lasers, free electron lasers, and the like. The laser type may include, for example, Argon Fluoride, Xenon Chloride, Xenon Fluoride, Helium Cadmium, Rhodamine 6G, Copper vapor, Argon, Frequency doubled Nd:YAG, Helium Neon, Krypton, Ruby, Laser Diodes, Ti:Sapphire, Alexandrite, Nd:YAG, Hydrogen Fluoride, Erbium:Glass, Carbon Monoxide, Carbon Dioxide, and the like.

In example aspects, parameters associated with a particular laser for use in accordance with aspects herein may be optimized to achieve desired properties in a nonwoven textile. For example, the wavelength emitted by the laser may be selected to cause heating of the electromagnetic radiation absorbing fibers used to form the nonwoven textile. In example aspects, the wavelength range contemplated herein ranges from about 400 nanometers (nm) to about 1070 nm. In further example aspects, the wavelengths contemplated herein include about 450 nm, 532 nm, 650 nm, and 1060 nm. These are just examples, and other wavelengths are contemplated as being within the scope herein. The intensity and/or energy density of the laser may be adjusted to achieve a desired level of penetration of the nonwoven textile. For example, the intensity may be adjusted to penetrate through at least 10%, 20%, 30%, 40%, 50%, 60%, 70%, 80%, 90%, or 100% of the thickness of the nonwoven textile. In example aspects, the intensity may be adjusted such that the electromagnetic radiation emitted by the laser penetrates into the interior volume (e.g., between about 20% to about 80% of the thickness of the nonwoven textile) of the nonwoven textile but does not extend to the face of the nonwoven textile that is opposite of the face to which the electromagnetic radiation is applied. Additional parameters to be adjusted include the duration of application of the electromagnetic radiation to the nonwoven textile. The duration may be selected to achieve a desired melting of fibers without causing overheating of the areas surrounding the affected fibers and/or disrupting the structural integrity of the nonwoven textile. Aspects herein contemplate a duration from about 1 millisecond to about 5 seconds. When the duration is multiplied by the energy density, an overall power density is determined. The beam width of the laser may also be adjusted to produce a selected size or surface area of a laser application site. Aspects herein contemplate a beam width equal to or greater than 1 to 2 mm. This, in turn, may affect the number of bonding structures formed in the nonwoven textile, the spacing between adjacent bonding structures, and the size of the individual bonding structures.

In example aspects, the electromagnetic radiation emitted by the laser may be applied to a nonwoven textile in a predefined pattern to create discrete bonding structures within the nonwoven textile. The pattern may be engineered to create a desired density of bonding structures within different areas of the nonwoven textile. For example, when the nonwoven textile is formed into an article of apparel, areas of the nonwoven textile exposed to higher rates of abrasions or use such as the elbow and collar regions of an upper-body garment or the buttocks and knee regions of a lower-body garment may have a relatively greater number of bonding structures per unit area compared to areas less prone to abrasion. The increased bonding structures at the high abrasion areas may lessen the formation of pills in these areas. In further example aspects, both the application of the electromagnetic radiation by the laser and the entanglement of the nonwoven textile may be digitized such that, for example, entanglement of the nonwoven textile occurs at areas that are different from the areas of the nonwoven textile where bonding structures are formed (e.g., the areas do not overlap within a particular x, y plane of the nonwoven textile). This may prevent overworking of the nonwoven textile so as to maintain the soft hand and drapability of the nonwoven textile making it ideal for use in articles of apparel.

In accordance with aspects herein, when the electromagnetic radiation emitted by a laser is absorbed by a first fiber that has a propensity to absorb the electromagnetic radiation, such as a polymer fiber that comprises carbon black (e.g., is coated or impregnated with carbon black), the radiation causes the first fiber to increase in temperature and, in example aspects, to melt. As used herein when describing that a fiber has a propensity to absorb electromagnetic radiation, aspects herein contemplate that the propensity to absorb electromagnetic radiation may be specific to a certain wavelength or a certain wavelength range (e.g., wavelengths in the infrared spectrum, visible spectrum, and/or the ultraviolet spectrum). When the melted first fiber is in contact with an adjacent second fiber that has a lower propensity to absorb the electromagnetic radiation, the melted first fiber may at least partially encapsulate portions of the adjacent second fiber. When the melted polymer material of the first fiber re-solidifies, a bonding structure is formed that may include an amorphous polymer agglomeration formed from the melted first fiber along with portions of the first fiber and/or the second fiber in a fiber form. The term "fiber form" generally means a structure that has the characteristics of a fiber including a length that is generally greater than a diameter of the fiber, and a relatively constant diameter along the length of the fiber.

In another example, a first fiber formed of material that has a relatively high melting temperature can comprise a material that absorbs electromagnetic radiation such as carbon black. For example, the first fiber can be coated with carbon black, impregnated with carbon black, or otherwise have carbon black combined therewithin. The first fibers (with the carbon black) may be blended or mixed with second fibers formed of a polymer material that has a relatively lower melting temperature (e.g., low melt fibers) and that generally do not absorb the electromagnetic radiation. When the first fibers with the carbon black are exposed to the electromagnetic radiation emitted by a laser, the carbon black may heat up to the point where it melts portions of the adjacent second fibers while the first fiber remains intact. In this example, the bonding structure may include an amorphous polymer agglomeration primarily composed of the re-solidified polymer material of the second fiber and portions of adjacent first fibers and adjacent second fibers in a fiber form.

In yet another example, aspects herein contemplate the use of bicomponent fibers having, for instance, an electromagnetic radiation absorbing material positioned in a side-by-side relationship with a material that has a relatively lower propensity to absorb the electromagnetic radiation. The bicomponent fibers may be mixed with other fiber types that may have a relatively lower propensity to absorb the electromagnetic radiation. When a laser emits electromagnetic radiation of a specified wavelength or wavelength range, the electromagnetic radiation absorbing material of the bicomponent fiber may raise in temperature to the point of melting. The melted material may encapsulate or partially encapsulate adjacent fibers having the relatively lower propensity to absorb the electromagnetic radiation. In this example, the bonding structure may include an amorphous agglomeration composed of the re-solidified electromagnetic radiation absorbing material from the bicomponent fiber, the material of the bicomponent fiber that has a relatively lower propensity to absorb the electromagnetic radiation where this material may retain its fiber form, and portions of adjacent non-bicomponent fibers that have the relatively lower propensity to absorb the electromagnetic radiation, where these fibers are also in a fiber form.

Aspects herein contemplate that the fibers having a relatively greater propensity to absorb electromagnetic radiation may comprise any number of known electromagnetic radiation absorbing materials. For example, additives may be imparted to the fibers such as carbon black, and/or other various pigments, including pigments that use porphyrin type compounds, and fillers to enhance the ability of the fibers to absorb electromagnetic radiation. The carbon black and/or the other various pigments and fillers may be intrinsic to the fiber itself (i.e., extruded with the fiber during the fiber formation process) or the carbon black and/or other various pigments and fillers may be applied as a coating that entirely or partially coats the fiber. Aspects herein also contemplate engineering fibers to not absorb electromagnetic radiation such as by the application of non-absorbing colorants. Any and all aspects, and any variation thereof, are contemplated as being within the scope herein.

Various measurements are provided herein with respect to the nonwoven textiles. A thickness of the nonwoven textile may be measured using a precision thickness gauge. To measure thickness, for example, the textile may be positioned on a flat anvil and a pressure foot is pressed on to it from the upper surface under a standard fixed load. A dial indicator on the precision thickness gauge gives an indication of the thickness in mm. Basis weight is measured using ISO3801 testing standard and has the units grams per square meter (gsm). Textile stiffness, which generally corresponds to drape is measured using ASTMD4032 (2008) testing standard and has the units kilogram force (Kgf). Fabric growth and recovery is measured using ASTM2594 testing standard and is expressed as a percentage. The term "stretch" as used herein means a textile characteristic measured as an increase of a specified distance under a prescribed tension and is generally expressed as a percentage of the original benchmark distance (i.e., the resting length or width). The term "growth" as used herein means an increase in distance of a specified benchmark (i.e., the resting length or width) after extension to a prescribed tension for a time interval followed by the release of tension and is usually expressed as a percentage of the original benchmark distance. "Recovery" as used herein means the ability of a textile to return to its original benchmark distance (i.e., its resting length or width) and is expressed as a percentage of the original benchmark distance. Thermal resistance, which generally corresponds to insulation features, is measured using ISO11092 testing standard and has the units of RCT ($M^2 * K/W$).

Unless otherwise noted, all measurements provided herein are measured at standard ambient temperature and pressure (25 degrees Celsius or 298.15 K and 1 bar) with the nonwoven textile or composite nonwoven textile in a resting (un-stretched) state.

FIG. 1 depicts a schematic of an example process 100 of finishing a nonwoven textile. At step 110, a first plurality of fibers 112 (shown with a solid line) having a first propensity to absorb electromagnetic radiation emitted by a laser at a specified wavelength or wavelength range is provided. The first plurality of fibers 112 may be in the form of loose fibers or may be in the form of a web, including an entangled web, of fibers. At step 110, a second plurality of fibers 114 (shown with dashed line) having a second propensity to absorb the electromagnetic radiation having the specified wavelength or wavelength range is additionally provided. In example aspects, the second propensity to absorb the electromagnetic radiation may be lower than the first propensity to absorb the electromagnetic radiation. The second plurality of fibers 114 also may be in the form of loose fibers or may be in the form of a web, including an entangled web, of fibers.

Aspects herein contemplate that the first plurality of fibers 112 may include fibers that absorb the electromagnetic radiation, and the second plurality of fibers 114 may include fibers that do not absorb the electromagnetic radiation. The fibers 112 and 114 may in example aspects comprise polyester or PET fibers (virgin, shredded, or re-extruded) although other polymeric materials are contemplated herein such as thermoplastic polyurethane, polyamides (e.g., nylon), and the like. In example aspects, the first plurality of fibers 112 may be coated or impregnated with carbon black which increases their propensity to absorb electromagnetic radiation. Other aspects herein contemplate that the first plurality of fibers 112 may include bicomponent fibers having an electromagnetic radiation absorbing material in a side-by-side relationship with a material that has a lower propensity or no propensity to absorb the electromagnetic radiation.

In example aspects, the fibers 112 and 114 may have a staple length of from about 40 mm to about 120 mm, from about 50 mm to about 110 mm, or from about 70 mm to about 100 mm. As used herein, the term "about" means within ±5% of an indicated value unless indicated otherwise. Having a staple length within this range ensures a sufficient length to support one or more bonding structures.

At step 116, the first and second pluralities of fibers 112 and 114 are blended or mixed to produce a nonwoven textile 118 as shown at step 120. The nonwoven textile 118 includes a first face 122 and an opposite second face 124. The blending or mixing may include, in some example aspects, entangling the fibers 112 and 114 using, for example, needle entanglement or hydroentanglement. In example aspects, the mixing of the fibers 112 and 114 may be selective to produce a non-homogenous distribution of the fibers 112 and 114 between the first face 122 and the second face 124. For example, from about 10% by weight or by number to about 90% by weight or by number of the fibers 112 and 114 may be mixed. The non-homogenous distribution of the fibers 112 and 114 may cause more of the second fibers 114 to be present at the first face 122 relative to the second face 124, and more of the first fibers 112 to be present at the second face 124 relative to the first face 122. Within the interior volume of the nonwoven textile 118 at least some of the first plurality of fibers 112 are located adjacent to or in contact with at least some of the second plurality of fibers 114. Moreover, within portions of the interior volume of the nonwoven textile 118, it is contemplated that there is a homogenous distribution of the first fibers 112 and the second fibers 114.

At step 126, electromagnetic radiation of a specified wavelength or wavelength range that targets, for example, the first plurality of fibers 112 is applied to the nonwoven textile 118 using a laser 128. The electromagnetic radiation may be applied in a pattern that includes spaced-apart application sites. Although the electromagnetic radiation is shown as being applied in a beam that is perpendicular to the surface plane of the first face 122 of the nonwoven textile 118, aspects herein contemplate that the angle of application may be varied from approximately 1 degree to about 89 degrees with respect to the surface plane of the first face 122.

In example aspects, the electromagnetic radiation is directed initially through the first face 122 of the nonwoven textile 118. In example aspects, because some of the first fibers 112 may have been moved into the first face 122, some bonding structures, such as bonding structure 130 may be formed on the first face 122 at one or more of the laser application sites as shown at step 131. However, because the first face 122 and portions of the nonwoven textile 118 positioned interior and adjacent to the first face 122 primarily comprise the second fibers 114 that have a lower propensity to absorb the electromagnetic radiation, the electromagnetic radiation may be directed primarily into the interior volume of the nonwoven textile 118. The result of this is that the second fibers 114 located on the first face 122 are generally unaffected by the electromagnetic radiation such that they retain the same characteristics, including their fiber form, they had before the electromagnetic radiation was applied to the nonwoven textile 118.

In the interior volume of the nonwoven, there is a greater number of contact points between the first fibers 112 and the second fibers 114 due to a higher degree of mixing within the interior volume of the nonwoven textile 118. As described, at least portions of the first fibers 112 absorb the electromagnetic radiation at the application sites which causes a rise in temperature up to and/or past the melting point of the polymer material forming the first fibers 112. Once melted, the polymer material of the first fibers 112 may come into contact with and/or wet portions of other fibers that are in contact with the melted polymer material including portions of adjacent second fibers 114 and portions of adjacent first fibers 112. When the laser 128 ceases emitting the electromagnetic energy, the melted polymer material of the first fibers 112 re-solidifies forming a bonding structure that includes an amorphous polymer agglomeration that partially or fully encapsulates portions of the first fibers 112 and/or the second fibers 114 that have been wetted by the melted polymer material. The portions of the first fibers 112 and/or the second fibers 114 maintain a fiber form. Thus, fibers extend from the amorphous polymer agglomeration in example aspects. The result of the bonding structures is to reduce the number of free fiber ends at one or more of the first face 122 and the second face 124 by either trapping the fiber ends, or maintaining the fibers in the bonding structure within a fixed position such that the fibers 112 and 114 have a reduced tendency to migrate within the nonwoven textile 118 and form pills on the first face 122 and the second face 124 of the nonwoven textile 118. Aspects herein contemplate that after the electromagnetic energy is applied to nonwoven textile 118, each of the first face 122 and the second face 124 have a pilling resistance of at least 2 on the Martingdale Pilling Test.

Figure 3:
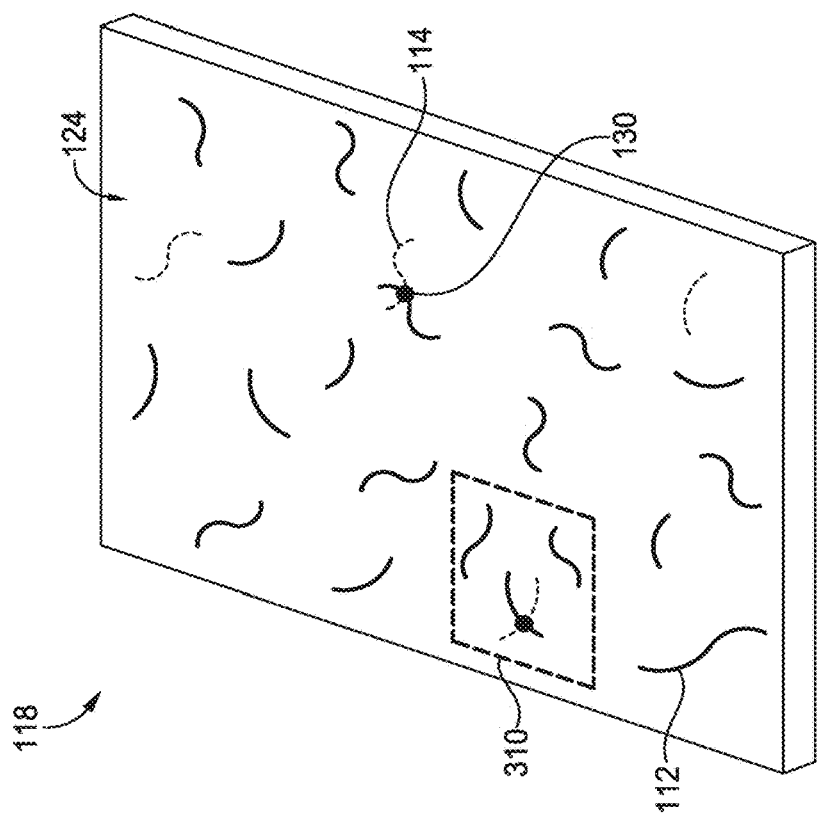
FIG. 3 illustrates an opposite second face of the nonwoven textile of FIG. 1 in accordance with aspects herein.
Figure 2:
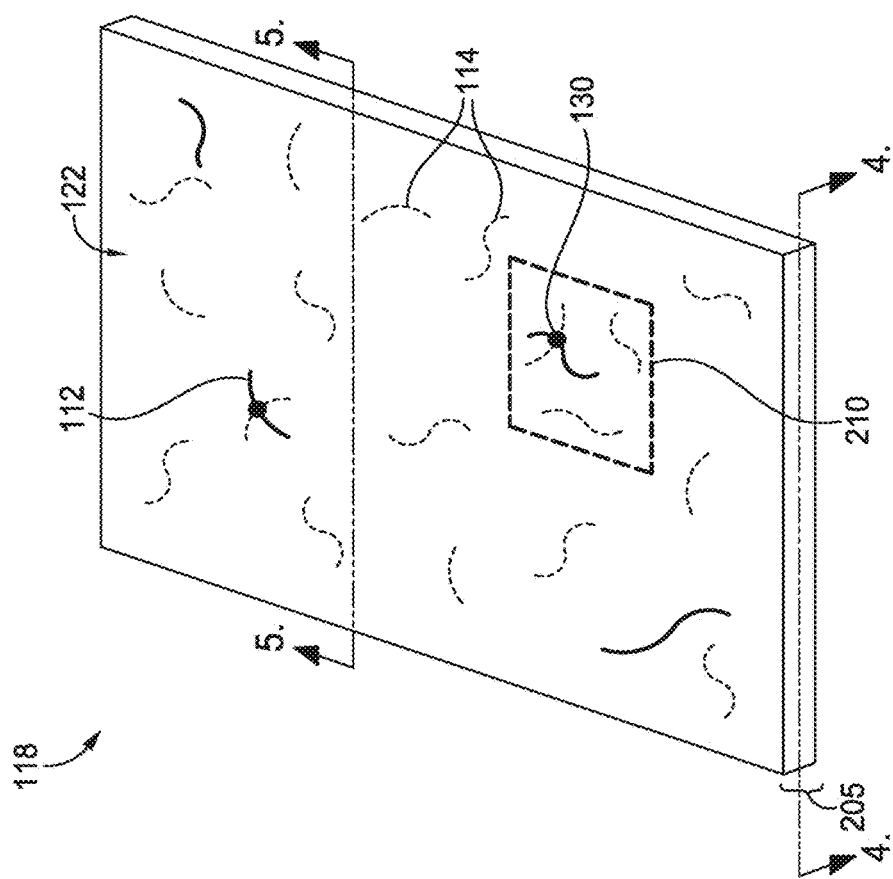
FIG. 2 illustrates a first face of the nonwoven textile of FIG. 1 in accordance with aspects herein.

FIG. 2 depicts the first face 122 of the nonwoven textile 118, and FIG. 3 depicts the second face 124 of the nonwoven textile 118. A volume 205 of the nonwoven textile 118 extends between the first face 122 and the second face 124. A unit area is depicted in each of FIGS. 2 and 3 and is indicated respectively by reference numerals 210 and 310. The unit area may be a 1 cm×1 cm square although other sizes are contemplated herein. As depicted, there is a greater number of the second plurality of fibers 114 per unit area 210 at the first face 122 relative to the second face 124. Additionally, there is a great number of the first plurality of fibers 112 per unit area 310 at the second face 124 relative to the first face 122. This may be due to the non-homogeneous or selective mixing of the first plurality of fibers 112 and the second plurality of fibers 114. Because some of the first fibers 112 may be moved to the first face 122, some bonding structures such as the bonding structure 130 may be present on the first face 122. With respect to the second face 124, in example aspects, parameters associated with the laser 128 may be adjusted such that there is minimal to no penetration of the electromagnetic radiation at or through the second face 124. As such, there may be minimal to no discrete bonding structures as evidenced by the relatively few bonding structures 130 shown in FIG. 3.

Figure 4:
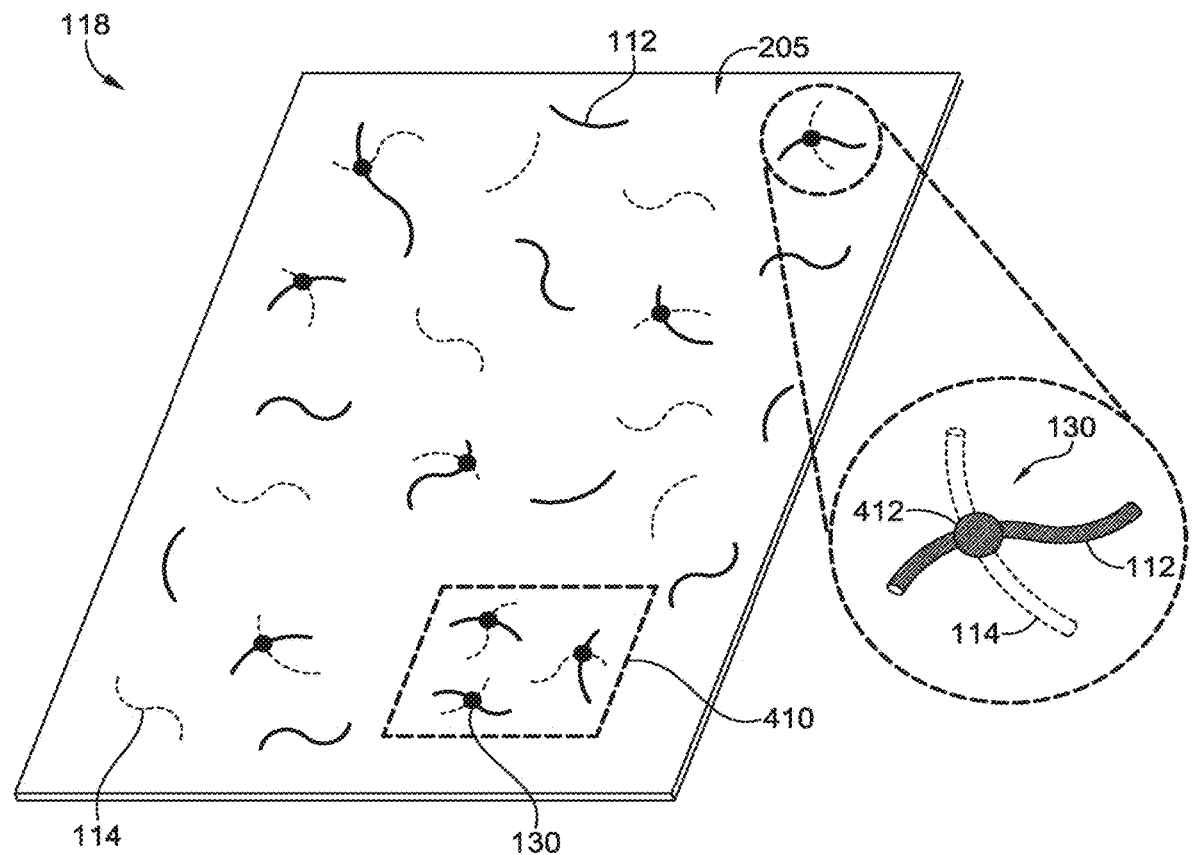
FIG. 4 illustrates a planar section of the nonwoven textile of FIG. 1 taken along the plane indicated at cut-line 4-4 of FIG. 2 in accordance with aspects herein.

FIG. 4 depicts a planar cross-section taken along the plane indicated by line 4-4 of FIG. 2. As such, the planar cross-section shown in FIG. 4 is taken approximately midway between the first face 122 and the second face 124 within the volume 205 of the nonwoven textile 118. A unit area is indicated by reference numeral 410. As depicted, there is a more equal distribution of the first plurality of fibers 112 and the second plurality of fibers 114 within the volume 205 of the nonwoven textile 118 such that two or more fibers of the first plurality of fibers 112 are located adjacent to or in contact with two or more fibers of the second plurality of fibers 114 within the volume 205 of the nonwoven textile 118. In example aspects, parameters associated with the laser 128 may be adjusted such that the penetration depth of the electromagnetic radiation is optimized to be within the volume 205 of the nonwoven textile 118. Thus, due to the greater number of first fibers 112 and second fibers 114 in contact with each other within the volume 205 of the nonwoven textile 118 and due to the penetration depth of the electromagnetic radiation emitted by the laser 128, the majority of the bonding structures 130 may be present within the volume 205 of the nonwoven textile 118. For example, in example aspects, there is a greater number of discrete bonding structures 130 per unit area 410 within the volume 205 of the nonwoven textile 118 compared to the number of discrete bonding structures 130 per unit area 210 on the first face 122 (e.g., three bonding structures 130 per unit area 410 compared to one bonding structure 130 per unit area 210). Further, there is a greater number of discrete bonding structures 130 per unit area 410 within the volume 205 of the nonwoven textile 118 compared to the number of discrete bonding structures 130 per unit area 310 on the second face 124 (e.g., three bonding structures 130 per unit area 410 compared to one bonding structure 130 per unit area 310). As stated earlier, this feature helps to preserve the characteristics of the first face 122 and the second face 124 such as a soft hand, abrasion resistance, and/or drapability.

FIG. 4 further depicts an enlarged view of a bonding structure 130 that includes an amorphous polymer agglomeration 412 formed from the melted and re-solidified first fiber 112. Remaining portions of the first fiber 112 are shown extending from the amorphous polymer agglomeration 412. The amorphous polymer agglomeration 412 also encapsulates or partially encapsulates portions of the second fiber 114 which is also shown extending from the amorphous polymer agglomeration 412. This is schematic depiction and aspects herein contemplate that the bonding structure 130 may have a different configuration or form.

Figure 5:
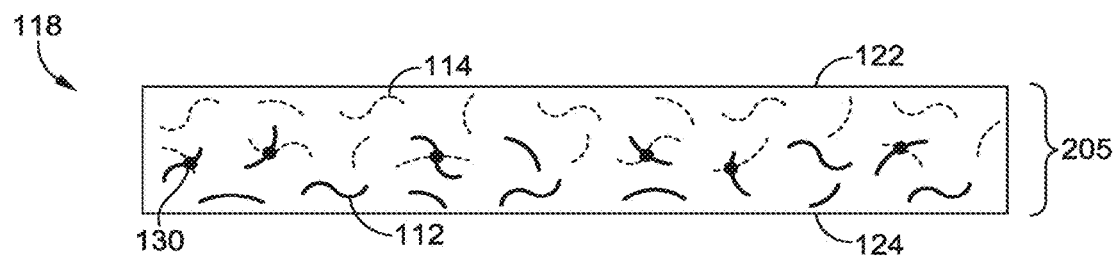
FIG. 5 illustrates a cross-section of the nonwoven textile of FIG. 1 taken at cut-line 5-5 of FIG. 2 in accordance with aspects herein.

FIG. 5 is a cross-section of the nonwoven textile 118 taken at cut line 5-5 of FIG. 2. The first face 122 and the second face 124 are depicted along with the interior volume 205 positioned between the first face 122 and the second face 124. The cross-section depicts the non-homogenous distribution of the first plurality of fibers 112 and the second plurality of fibers 114 such that more of the second fibers 114 are positioned at or adjacent to the first face 122 and more of the first fibers 112 are positioned at or adjacent to the second face 124. There is a generally equal distribution of the first fibers 112 and the second fibers 114 within the interior volume 205 of the nonwoven textile 118 and a correspondingly greater number of bonding structures 130 within the interior volume of the nonwoven textile 118 compared to the first face 122 and the second face 124.

Figure 6:
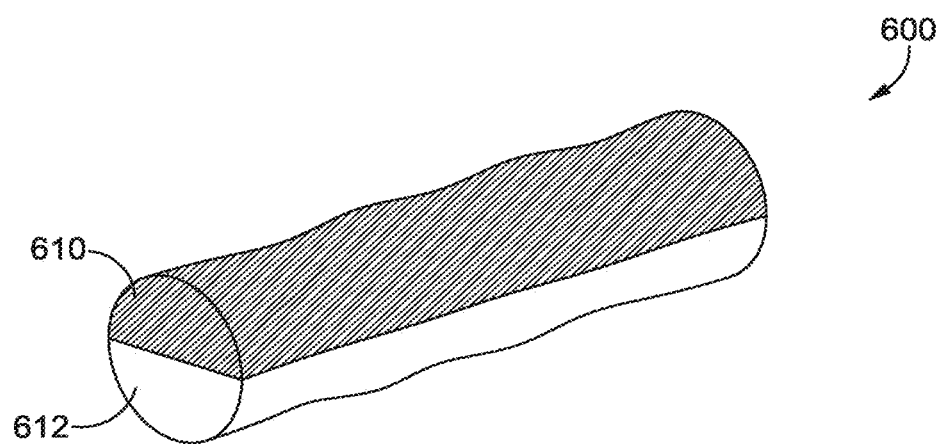
FIG. 6 illustrates an example bi-component fiber having two materials with different propensities for absorbing electromagnetic radiation emitted by a laser positioned in a side-by-side relationship in accordance with aspects herein.

FIG. 6 depicts an example bicomponent fiber 600 having an electromagnetic radiation absorbing material 610 positioned in a side-by-side relationship with a second material 612. The second material 612 may comprise a material that has a lower propensity to absorb the electromagnetic radiation compared to the material 610. In some aspects, the second material 612 may not absorb the electromagnetic radiation. With respect to the electromagnetic radiation absorbing material 610, the material 610 may comprise, for example a polymer material that is impregnated or at least partially coated with carbon black or other dyes/pigments. As described, when the bicomponent fiber 600 is exposed to the electromagnetic radiation, all or portions of the electromagnetic radiation absorbing material 610 may melt while the second material 612 remains generally intact in a fiber-like form. If the bicomponent fiber 600 is in contact with or adjacent to other fibers, including other bicomponent fibers 600, the melted material 610 may encapsulate or partially encapsulate the other fibers to form a bonding structure as described above. In this example, the bonding structure would include an amorphous polymer agglomerate formed from the melted and re-solidified material 610, the second material 612 in a fiber form, and one or more other fibers in a fiber form.

Figure 7:
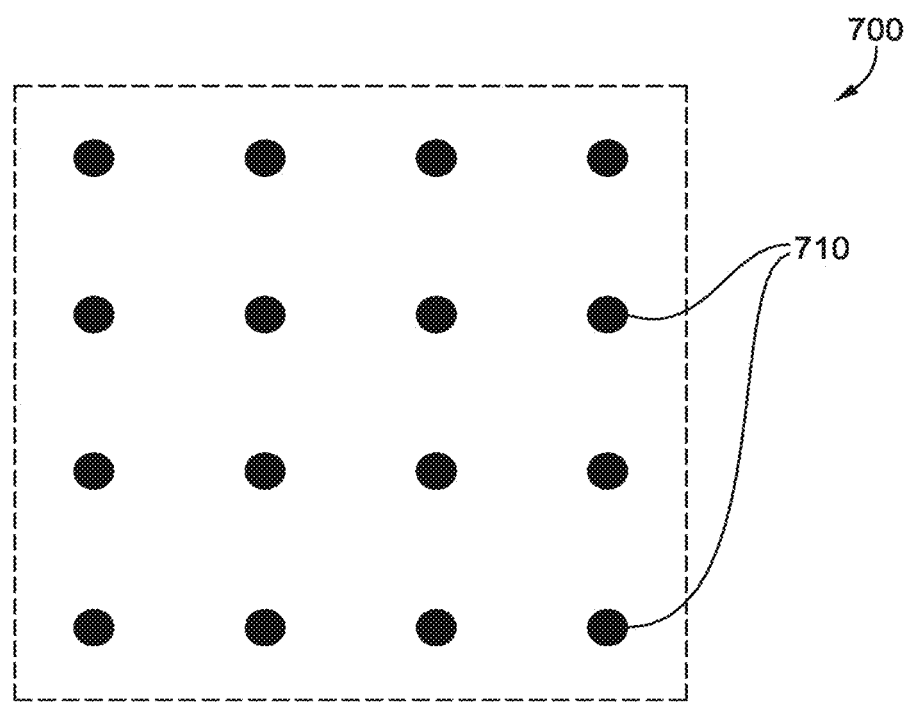
FIG. 7 illustrates an example pattern for electromagnetic radiation application by a laser on a nonwoven textile in accordance with aspects herein.

FIG. 7 depicts an example pattern 700 for electromagnetic radiation application from, for example the laser 128. The pattern 700 includes a plurality of discrete, spaced-apart application sites 710, where the application sites 710 represent areas of a nonwoven textile, such as the nonwoven textile 118, that are exposed to the electromagnetic radiation. The pattern 700 is illustrative, and it is contemplated herein, that the laser may be programmed to apply the electromagnetic radiation in any desired pattern to achieve a desired functional effect.

Figure 8:
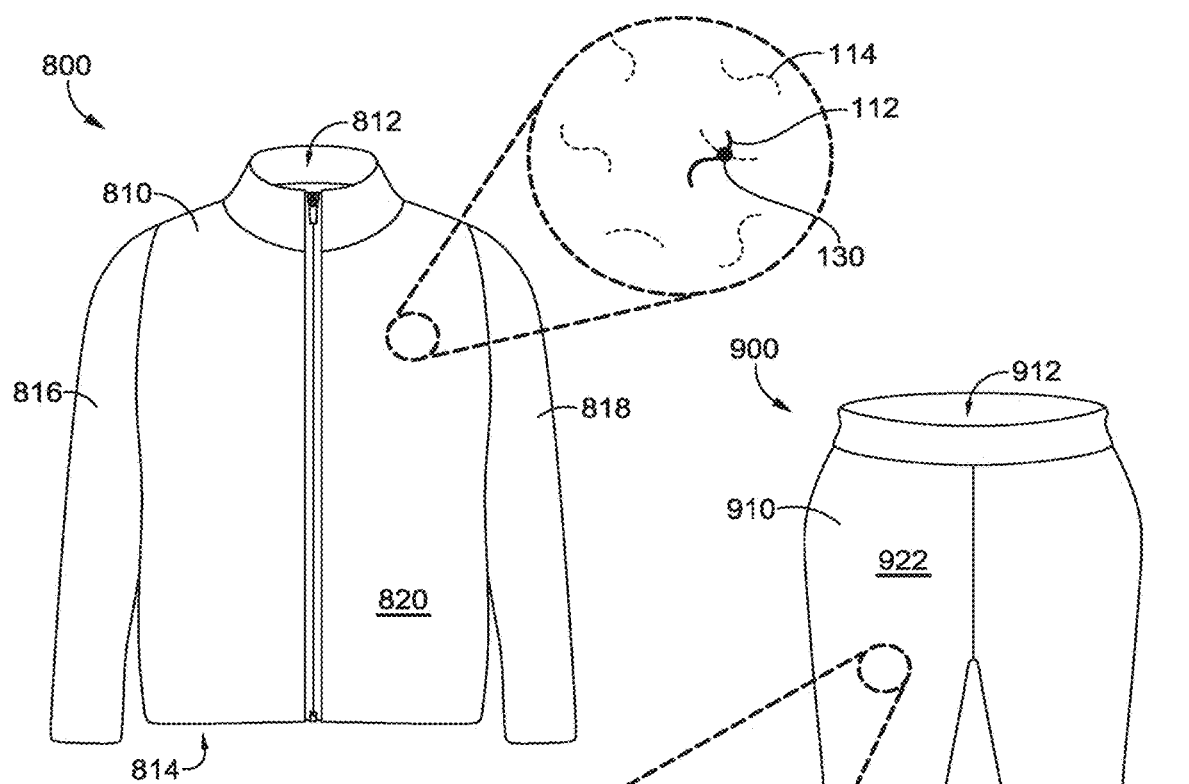
FIG. 8 illustrates an example upper-body garment formed from the nonwoven textile of FIG. 1 in accordance with aspects herein.
Figure 9:
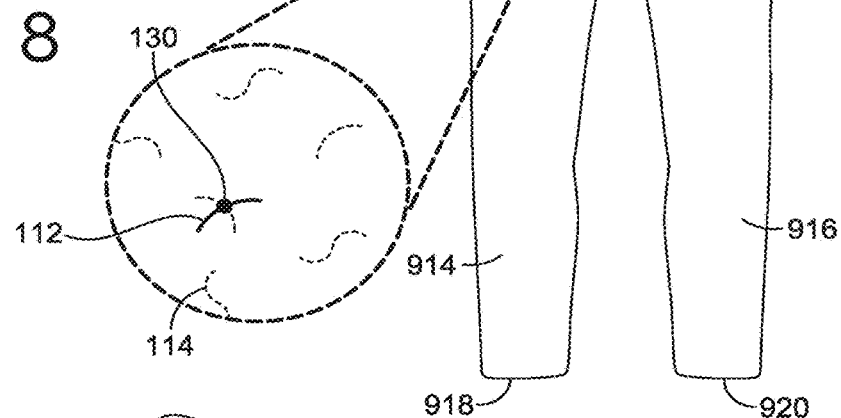
FIG. 9 illustrates an example lower-body garment formed from the nonwoven textile of FIG. 1 in accordance with aspects herein.
Figure 10:
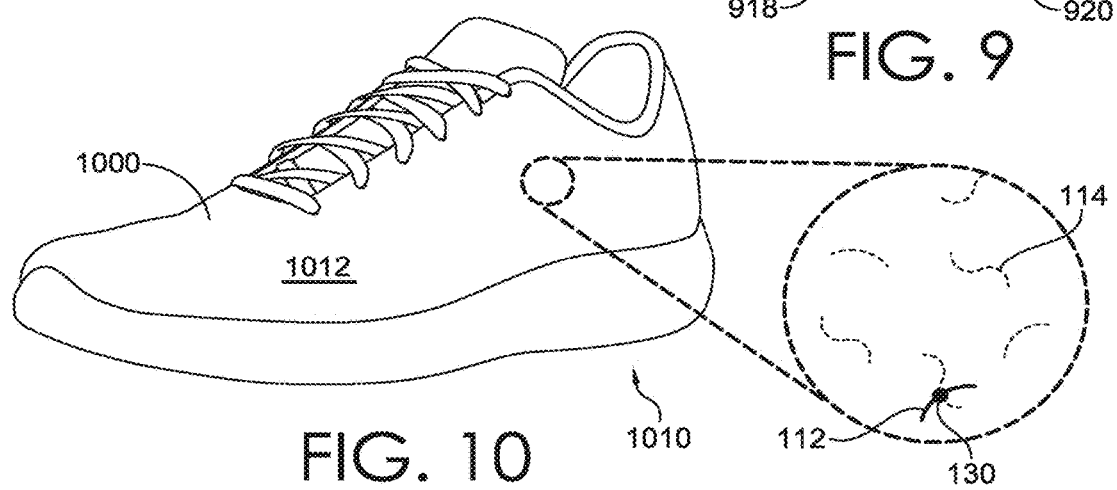
FIG. 10 illustrates an example upper for an article of footwear formed from the nonwoven textile of FIG. 1 in accordance with aspects herein.

FIGS. 8-10 depicts example articles of apparel formed from the nonwoven textile 118. With respect to FIG. 8, FIG. 8 depicts an example upper-body garment 800 in the form of a jacket. Although shown as a jacket, aspects herein contemplate that the upper-body garment 800 may be in the form of a shirt with sleeves (long or short), a pullover, a hoodie, a tank, a vest, and the like. The upper-body garment 800 includes a torso portion 810 that defines a neck opening 812 and a waist opening 814. First and second sleeves 816 and 818 extend from the torso portion 810.

In example aspects, the first face 122 of the nonwoven textile 118 forms an outer-facing surface 820 of the garment 800, and in example aspects may form an outermost-facing surface of the garment 800. In this example, the second face 124 forms an inner-facing surface (not shown) of the garment 800, and in example aspects, may form an innermost-facing surface of the garment 800. An enlarged view of the nonwoven textile 118 is shown with the first fibers 112, the second fibers 114, and the bonding structure 130. Aspects herein also contemplate that the second face 124 forms the outer-facing surface of the garment 800, and the first face 122 forms the inner-facing surface of the garment 800.

Aspects herein contemplate adjusting parameters associated with a laser, such as the laser 128, so that a greater density of bonding structures 130 are formed in areas of the upper-body garment 800 that typically experience higher rates of abrasion compared to remaining areas of the upper-body garment 800. For example, with respect to the upper-body garment 800, areas that may typically experience higher rates of abrasion, and subsequent pilling, include, for example, the elbow areas, collar area, waistband area, and cuff area. In some example aspects, the areas having a greater density of bonding structures 130 may be based on a particular sport for which the upper-body garment 800 is designed. In one example where the sport is running, a greater density of bonding structures 130 may be formed along the sides of the torso portion and in the underarm portion as these areas may experience a relatively higher amount of abrasion and subsequent pilling due to a wearer's arm movements when running.

FIG. 9 depicts an example lower-body garment 900 in the form of a pant. Although shown as a pant, aspects herein contemplate that the lower-body garment 900 may be in the form of a tight, a capri, a short, a skirt, a unitard, and the like. The lower-body garment 900 includes a torso portion 910 that defines a waist opening 912. A first leg portion 914 and a second leg portion 916 extend from the torso portion 910 and respectively terminate in a first leg opening 918 and a second leg opening 920.

In example aspects, the first face 122 of the nonwoven textile 118 forms an outer-facing surface 922 of the garment 900, and in example aspects may form an outermost-facing surface of the garment 900. In this example, the second face 124 forms an inner-facing surface (not shown) of the garment 900, and in example aspects, may form an innermost-facing surface of the garment 900. An enlarged view of the nonwoven textile 118 is shown with the first fibers 112, the second fibers 114, and the bonding structure 130. Aspects herein also contemplate that the second face 124 forms the outer-facing surface of the garment 900, and the first face 122 forms the inner-facing surface of the garment 900.

Aspects herein contemplate adjusting parameters associated with a laser, such as the laser 128, so that a greater density of bonding structures 130 are formed in areas of the lower-body garment 900 that typically experience higher rates of abrasion compared to remaining areas of the lower-body garment 900. Some example locations include the knee areas, the waist opening area, leg cuff areas, and/or the buttocks portion. Similar to the upper-body garment 800, the areas of greater density of bonding structures 130 may be based on a particular sport for which the lower-body garment 900 is designed. For example, where the sport is running or cycling, a greater density of bonding structures 130 may be formed along the inner thigh portions of the lower-body garment 900 as these areas may experience a relatively higher amount of abrasion due to a wearer's leg movements when running and/or cycling.

FIG. 10 depicts an upper 1000 for an article of footwear 1010. The article of footwear 1010 may encompass any type of articles of footwear including athletic shoes, sandals, fashion shoes (men and women), and the like. In the example shown in FIG. 10, the first face 122 of the nonwoven textile 118 forms an outer-facing surface 1012 of the upper 1000, and in example aspects may form an outermost-facing surface of the upper 1000. In this example, the second face 124 forms an inner-facing surface (not shown) of the upper 1000, and in example aspects, may form an innermost-facing surface of the upper 1000. An enlarged view of the nonwoven textile 118 is shown with the first fibers 112, the second fibers 114, and the bonding structure 130. Aspects herein also contemplate that the second face 124 forms the outer-facing surface of the upper 1000, and the first face 122 forms the inner-facing surface of the upper 1000.

Aspects herein contemplate adjusting parameters associated with a laser, such as the laser 128, so that a greater density of bonding structures 130 are formed in areas of the upper 1000 that typically experience higher rates of abrasion compared to remaining areas of the upper 1000. For example, there may be greater density of bonding structures 130 around an ankle opening of the upper 1000, at a toe end of the upper 1000 and along the medial and lateral sides of the upper 1000. The locations of the greater density of bonding structures 130 may be dependent upon a particular sport for which the article of footwear 1010 is to be used. For example, in soccer, a greater density of bonding structures 130 may be located at the toe end of the upper as this area may come into contact with a soccer ball more than other areas of the upper 1000.

Figure 11:
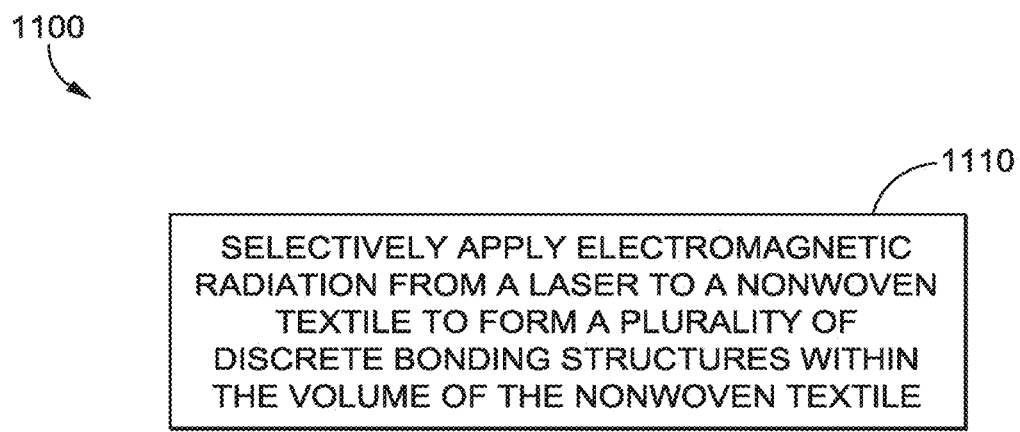
FIG. 11 illustrates an example flow diagram of a method of finishing a nonwoven textile, such as the nonwoven textile of FIG. 1 in accordance with aspects herein.

FIG. 11 depicts a flow diagram of an example method of finishing a nonwoven textile, such as the nonwoven textile 118, and is referenced generally by the numeral 1100. Like the nonwoven textile 118, the nonwoven textile in the method 1100 includes a first face, such as the first face 122, an opposite second face, such as the second face 124, and a volume, such as volume 205 between the first face and the second face. The nonwoven textile includes at least a first plurality of fibers that have a first propensity to absorb electromagnetic radiation of a specified wavelength or wavelength range such as the first plurality of fibers 112, and a second plurality of fibers having a second propensity to absorb the electromagnetic radiation that is lower than the first propensity. The second plurality of fibers may be the second plurality of fibers 114. The first plurality of fibers are mixed and/or entangled with the second plurality of fibers to achieve a non-homogenous distribution of the fibers such that a greater number of the first plurality of fibers per unit area are present at the second face and a greater number of the second plurality of fibers per unit area are present at the first face.

At a step 1110, electromagnetic radiation of the specified wavelength or wavelength range is selectively applied to the nonwoven textile by a laser, such as the laser 128 to form a plurality of discrete bonding structures such as the bonding structure 130. Parameters associated with the laser may be adjusted such that the bonding structures are located within the volume of the nonwoven textile and are generally positioned between the first face and the second face. Each of the bonding structures includes one or more amorphous polymer agglomerates formed from the first plurality of fibers where the agglomerate encapsulates or partially encapsulates neighboring fibers such as one or more of the first plurality of fibers and/or the second plurality of fibers to form the bond structure. At least the second fibers in the bonding structure maintain their fiber form. Because the bonding structures help to retain both the first and second pluralities of fibers in a fixed position, the fibers have a reduced tendency to migrate and form pills. Thus, the finishing method 1100 may be used to increase the nonwoven textile's resistance to pilling and, in example aspects, the Martingdale Pilling Score of the resulting textile may be 2 or more. This is accomplished while maintaining the surface characteristics of at least the first face since the electromagnetic radiation generally passes through the first face without affecting the second plurality of fibers present on the first face.

Figure 12:
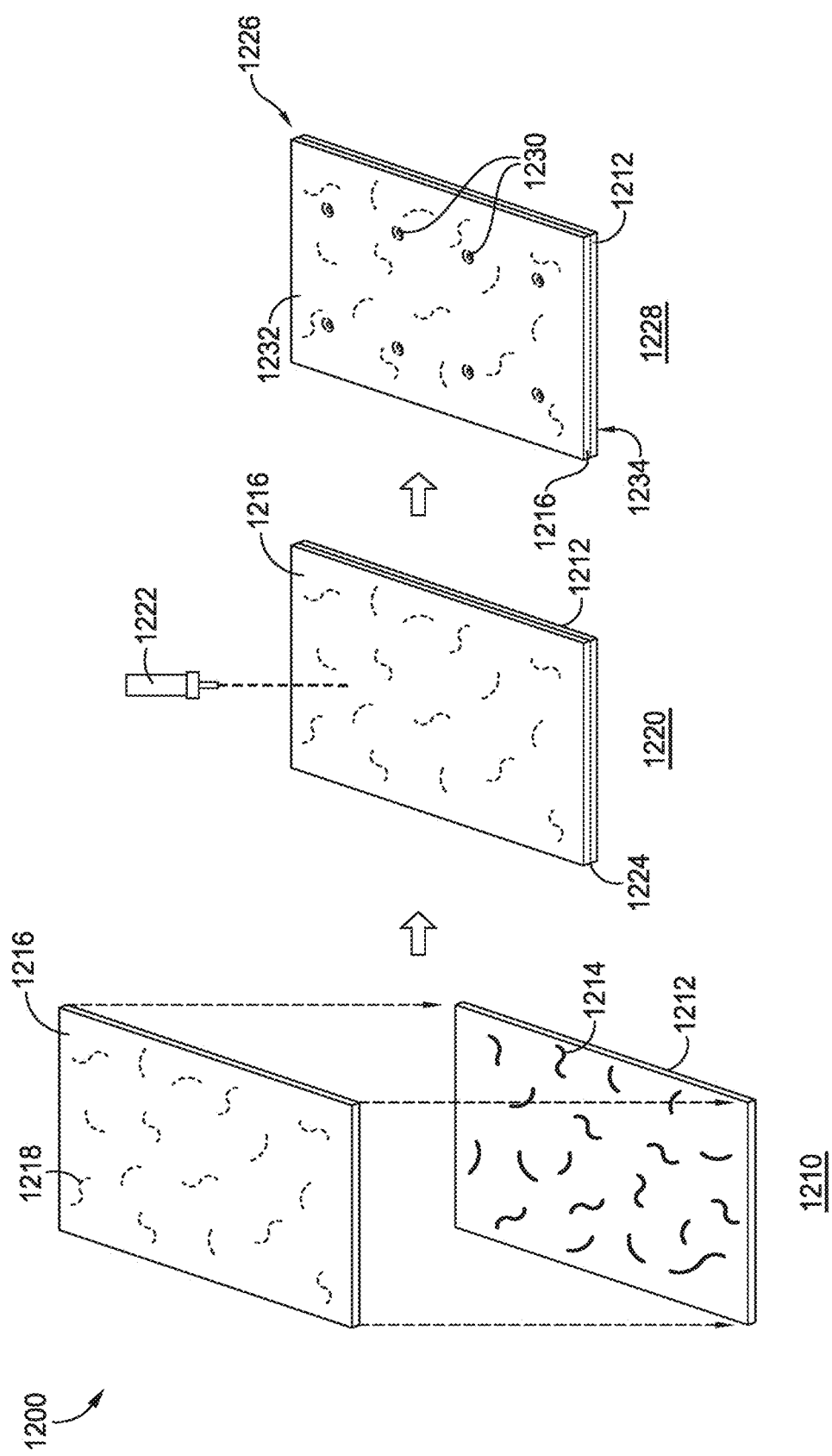
FIG. 12 illustrates a schematic of an example process of forming a composite nonwoven textile using laser bonding in accordance with aspects herein.

Aspects herein further contemplate that electromagnetic radiation emitted by a laser may also be used to bond together different nonwoven layers or fiber webs thus eliminating the need to use other more labor-intensive and/or less sustainable affixing technologies such as stitching, adhesives, films, and the like. FIG. 12 depicts a schematic of an example process 1200 for forming a composite nonwoven textile by using electromagnetic radiation emitted by a laser to create bonding structures at an interface region of different webs of fibers.

At step 1210, a surface of a first web of fibers 1212 formed from first fibers 1214 (shown with a solid line) having a first propensity to absorb electromagnetic radiation of a specified wavelength or wavelength range is positioned adjacent to a surface of a second web of fibers 1216 formed from second fibers 1218 (shown with dashed line) having a second propensity to absorb the electromagnetic radiation, where the second propensity is lower than the first propensity. In some example aspects, after the first and second webs of fibers 1212 and 1216 are positioned adjacent to each other, a laser transmissive material, such as glass, may be positioned on the second web of fibers 1216 to ensure a high degree of contact at the interface between the first and second webs 1212 and 1216.

Each of the first web of fibers 1212 and the second web of fibers 1216 may, in example aspects, comprise an entangled web of fibers (e.g., fibers entangled using, for example, needle entanglement or hydroentanglement). Each of the first web and the second web 1212 and 1216 may include additional fibers other than the first fibers 1214 and the second fibers 1218. One or more of the first web of fibers 1212 and the second web of fibers 1216 may include a meltblown or spunlaid web of fibers. One or more of the first web and the second web 1212 and 1216 may be selected to achieve a desired property in the resulting composite nonwoven textile. For example, the first web 1212 may be configured to better withstand abrasion by including larger denier fibers and/or a greater density of bonding structures such as those described with respect to the nonwoven textile 118. In example aspects, the second web 1216 may be configured to have a soft hand by including smaller denier fibers, including meltblown or spunlaid fibers, using silicone-coated fibers, and the like. These are just illustrative examples and aspects herein contemplate selecting any number of properties, including color, to achieve a desired set of features in the composite nonwoven textile.

Aspects herein contemplate that the first fibers 1214 may include fibers that absorb the electromagnetic radiation, and the second fibers 1218 may include fibers that do not absorb the electromagnetic radiation. The first and second fibers 1214 and 1218 may in example aspects comprise polyester or PET fibers (virgin, shredded, or re-extruded) although other polymeric materials are contemplated herein such as thermoplastic polyurethane, polyamides (e.g., nylon), and the like. In example aspects, the first fibers 1214 may be coated or impregnated with carbon black which increases their propensity to absorb the electromagnetic radiation. Other aspects herein contemplate that the first fibers 1214 may include bicomponent fibers having an electromagnetic radiation absorbing material in a side-by-side relationship with a material that has a lower propensity or no propensity to absorb the electromagnetic radiation.

At a step 1220, electromagnetic radiation of the specified wavelength or wavelength range that targets, for example, the first fibers 1214 is applied to the second web of fibers 1216 using a laser 1222. The electromagnetic radiation may be applied in a pattern that includes spaced-apart application sites. Although the electromagnetic radiation is shown as being applied in a beam that is perpendicular to the surface plane of the second web of fibers 1216, aspects herein contemplate that the angle of application may be varied from approximately 1 degree to about 89 degrees with respect to the surface plane of the second web of fibers 1216.

In example aspects, the electromagnetic radiation may be transmitted through the second web of fibers 1216 without affecting the structural integrity of the second fibers 1218 since they have a lower propensity to absorb the electromagnetic radiation. As such, the electromagnetic radiation may be directed primarily into the interior volume of the stacked configuration of the first web of fibers 1212 and the second web of fibers 1214. The result of this is that the second fibers 1218 located in the second web of fibers 1216 are generally unaffected by the electromagnetic radiation in that they retain the same characteristics they had before the electromagnetic radiation was applied to the second web of fibers 1216.

At an interface 1224 between the first web of fibers 1212 and the second web of fibers 1216 in the interior volume of the nonwoven, there is a greater number of contact points between the first fibers 1214 and the second fibers 1218. At the interface 1224, at least portions of the first fibers 1214 absorb the electromagnetic radiation at the application sites which causes a rise in temperature up to and/or past the melting point of the polymer material forming the first fibers 1214. Once melted, the polymer material of the first fibers 1214 may come into contact with and/or wet portions of other fibers that are in contact with the melted polymer material including portions of adjacent second fibers 1218 and portions of adjacent first fibers 1214. When the laser 1222 ceases emitting the electromagnetic energy, the melted polymer material of the first fibers 1214 re-solidifies forming a bonding structure that includes an amorphous polymer agglomeration that encapsulates or partially encapsulates portions of the first fibers 1214 and/or the second fibers 1218 that have been wetted by the melted polymer material. The portions of the first fibers 1214 and/or the second fibers 1218 maintain a fiber form. Thus, fibers extend from the amorphous polymer agglomeration in example aspects. The bonding structures form multiple bond points between the first web of fibers 1212 and the second web of fibers 1216 to form a composite nonwoven textile 1226 as shown at step 1228. The composite nonwoven textile 1226 includes a first face 1232 formed by the second web of fibers 1216 and an opposite second face 1234 formed by the first web of fibers 1212.

In some example aspects, the composite nonwoven textile 1226 may include depressions or dimples 1230 in the first face 1232. The dimples 1230 may represent areas where the underlying second fibers 1218 are part of a bonding structure. Because these fibers are not free to move, they may create tension on other second fibers 1218 with which they are entangled thus causing the dimples 1230. Similar dimples may be formed in the second face 1234 of the composite nonwoven textile 1226 due to entrapment of the first fibers 1214 in the bonding structure and the exertion of tension on the other second fibers 1218 with which they are entangled. In example aspects, the dimples 1230 on the first face 1232 and/or the second face 1234 may be axially aligned with a bonding structure located at the interface 1224 between the first web of fibers 1212 and the second web of fibers 1216. Thus, the thickness of the composite nonwoven textile 1226 may be reduced in areas corresponding to the dimples 1230. As described further below, because the thickness of the composite nonwoven textile 1226 is reduced in areas corresponding to the dimples 1230, the dimples 1230 may be used to create fold lines to increase the drape of a nonwoven textile. They may also be used to create markings on a nonwoven textile to indicate patterns which may be subsequently excised or removed from the nonwoven textile. Any and all aspects, and any variation thereof, are contemplated as being within the scope herein. Similar dimples may be formed on the nonwoven textile 118 if one or more of the first plurality of fibers 112 and/or the second plurality of fibers 114 are entangled.

Figure 14:
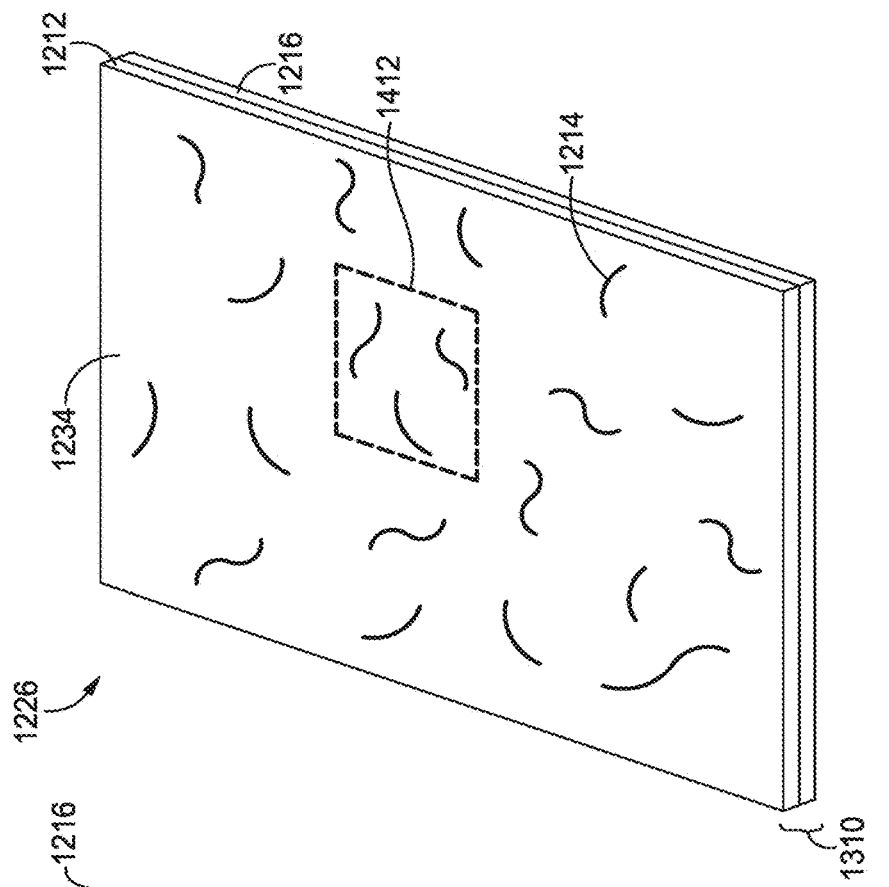
FIG. 14 illustrates an opposite second face of the composite nonwoven textile of FIG. 12 in accordance with aspects herein.
Figure 13:
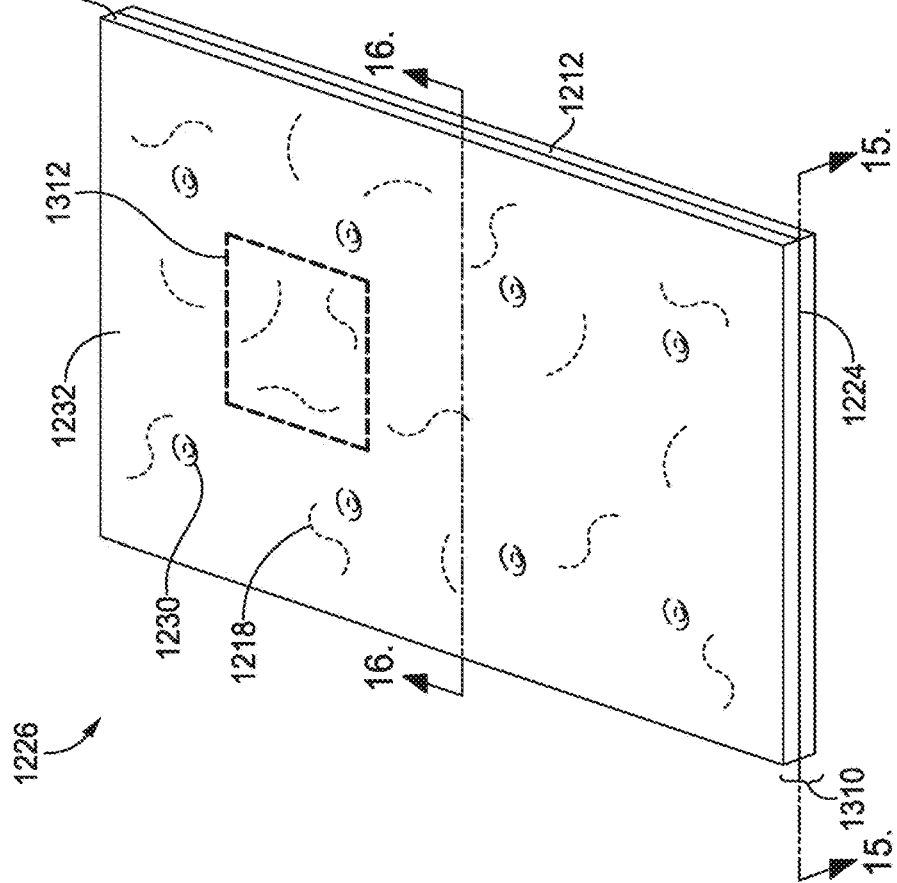
FIG. 13 illustrates a first face of the composite nonwoven textile of FIG. 12 in accordance with aspects herein.

FIG. 13 depicts the first face 1232 of the composite nonwoven textile 1226, and FIG. 14 depicts the second face 1234 of the composite nonwoven textile 1226. A volume 1310 extends between the first face 1232 and the second face 1234. The dimples 1230 are shown in the first face 1232, and example aspects herein contemplate that, although not shown, the second face 1234 may also include the dimples 1230. A unit area is depicted in each of FIGS. 13 and 14 and is indicated respectively by reference numerals 1312 and 1412. In example aspects, when the second fibers 1218 do not absorb or minimally absorb the electromagnetic radiation emitted by the laser 1222 such that the second fibers 1218 do not melt, bonding structures are not present on the first face 1232 as shown in FIG. 13. Stated differently, the number of bonding structures per unit area 1312 is zero. In example aspects, parameters, such as intensity, associated with the laser 1222 may be configured such that the electromagnetic radiation is not transmitted or minimally transmitted to the second face 1234 of the composite nonwoven textile 1226. If the electromagnetic radiation is not transmitted to the second face 1234, then the number of bonding structures per unit area 1412 may be zero.

Figure 15:
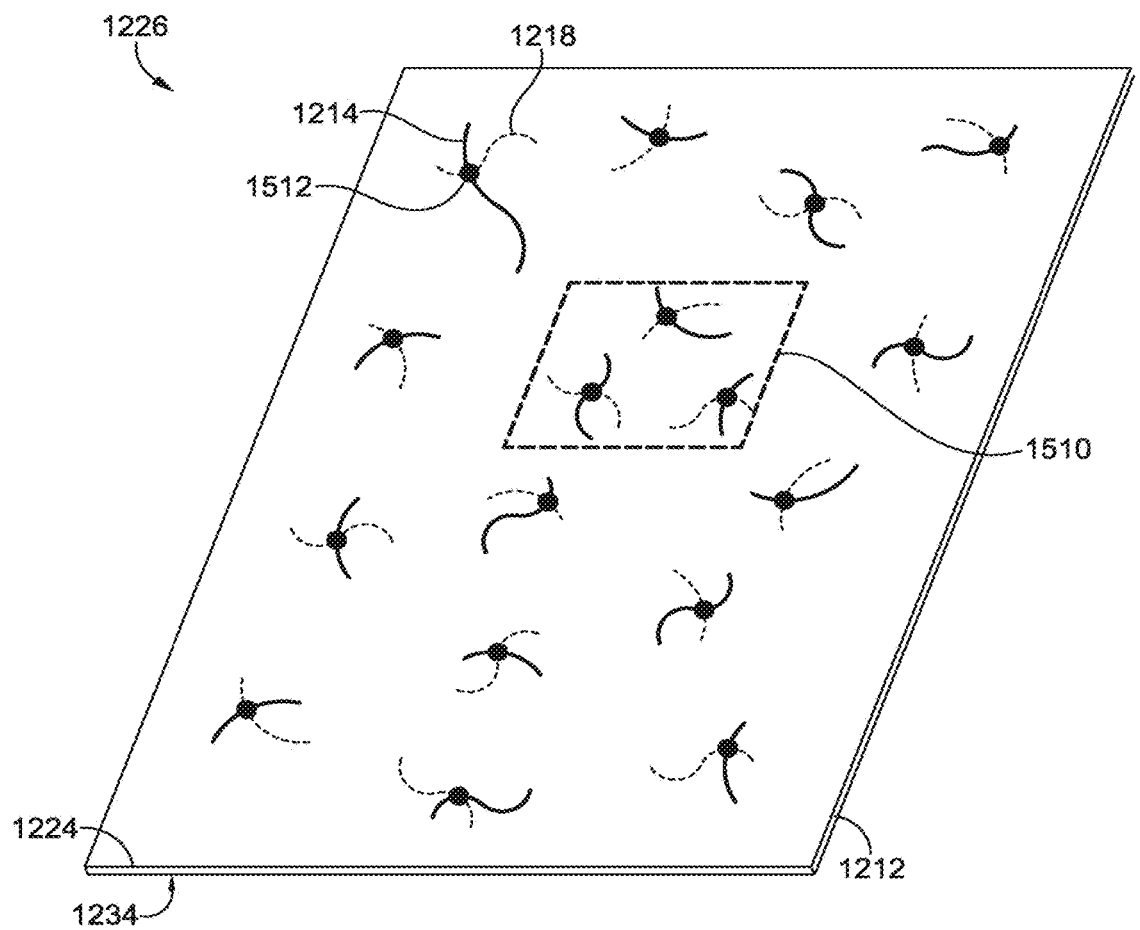
FIG. 15 illustrates a planar section of the composite nonwoven textile of FIG. 12 taken along the plane indicated at cut-line 15-15 of FIG. 13 in accordance with aspects herein.

FIG. 15 depicts a planar cross-section taken along the plane indicated by line 15-15 of FIG. 13. The planar cross-section in this example is taken at the interface 1224 of the first web of fibers 1212 and the second web of fibers 1216 within the interior volume 1310 of the composite nonwoven textile 1226. A unit area is indicated by reference numeral 1510. At the interface 1224 of the first web 1212 and the second web 1216, two or more of the first fibers 1214 are located adjacent to or are in contact with two or more of the second fibers 1218 within the volume 1310 of the composite nonwoven textile 1226. In example aspects, parameters associated with the laser 1222 may be adjusted such that the intensity and/or penetration depth of the electromagnetic radiation is optimized to be within the volume 1310 of the composite nonwoven textile 1226. More particularly, parameters associated with the laser 1222 may be adjusted such that the penetration depth is optimized to coincide with the location of the interface 1224 between the first web of fibers 1212 and the second web of fibers 1216.

Due to the greater number of first fibers 1214 and second fibers 1218 in contact with each other at the interface 1224, discrete bonding structures such as bonding structure 1512 may be formed at the interface 1224. As such, in example aspects, there is a greater number of discrete bonding structures 1512 per unit area 1510 within the volume 1310 of the composite nonwoven textile 1226 compared to the number of discrete bonding structures 1512 per unit area 1312 on the first face 1232 (e.g., three bonding structures 1512 per unit area 1510 compared to zero bonding structures 1512 per unit area 1312). Further, there is a greater number of discrete bonding structures 1512 per unit area 1510 within the volume 1310 of the composite nonwoven textile 1226 compared to the number of discrete bonding structures 1512 per unit area 1412 on the second face 1234 (e.g., three bonding structures 1512 per unit area 1510 compared to zero bonding structures 1512 per unit area 1412). This feature helps to preserve the characteristics of the first face 1232 and the second face 1234. The bonding structures 1512 formed within the volume 1310 of the composite nonwoven textile 1226 are similar in structure to the bonding structure 130 described and depicted with respect to the nonwoven textile 118.

Figure 16:
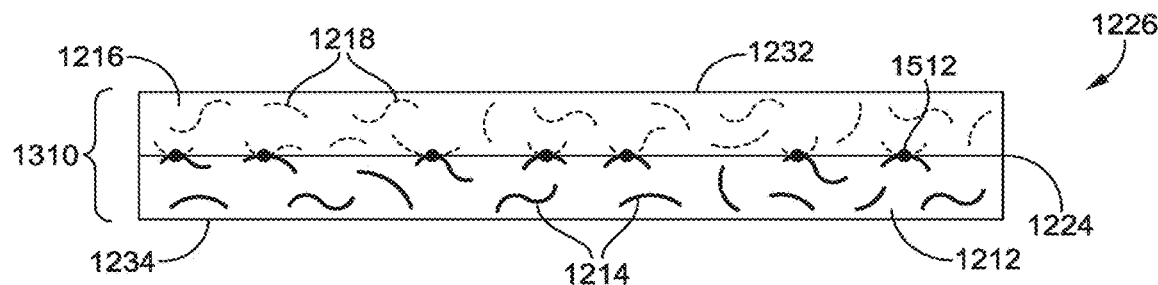
FIG. 16 illustrates a cross-section of the composite nonwoven textile of FIG. 12 taken along cut-line 16-16 of FIG. 13 in accordance with aspects herein.

FIG. 16 is a cross-section of the composite nonwoven textile 1226 taken at cut line 16-16 of FIG. 13. The first face 1232 and the second face 1234 are depicted along with the interior volume 1310 positioned between the first face 1232 and the second face 1234. The interface 1224 is further depicted and represents the location where a surface of the first web of fibers 1212 is in contact with a surface of the second web of fibers 1216. A number of discrete bonding structures 1512 are shown in a spaced-apart relationship at the interface 1224 within the volume 1310 of the composite nonwoven textile 1226. The bonding structures 1512 function to secure or bond the first web of fibers 1212 and the second web of fibers 1216 together. In example aspects, the bonding structures 1512 represent the sole affixation structure that secures the first and second webs 1212 and 1216 together. Other example aspects contemplate that additional methods may be used to secure the webs 1212 and 1216 together.

FIGS. 17-19 depict example articles of apparel formed from the composite nonwoven textile 1226. With respect to FIG. 17, FIG. 17 depicts an example upper-body garment 1700 in the form of a jacket. Although shown as a jacket, aspects herein contemplate that the upper-body garment 1700 may be in the form of a shirt with sleeves (long or short), a pullover, a hoodie, a tank, a vest, and the like. The upper-body garment 1700 includes a torso portion 1710 that defines a neck opening 1712 and a waist opening 1714. First and second sleeves 1716 and 1718 extend from the torso portion 1710.

In example aspects, the first face 1232 of the composite nonwoven textile 1226 forms an outer-facing surface 1720 of the garment 1700, and in example aspects may form an outermost-facing surface of the garment 1700. In this example, the second face 1234 forms an inner-facing surface (not shown) of the garment 1700, and in example aspects, may form an innermost-facing surface of the garment 1700. An enlarged view of the first face 1232 of the composite nonwoven textile 1226 is shown with the second fibers 1218. Aspects herein also contemplate that the second face 1234 forms the outer-facing surface of the garment 1700, and the first face 1232 forms the inner-facing surface of the garment 1700.

Aspects herein contemplate adjusting parameters associated with a laser, such as the laser 1222, so that a greater density of bonding structures 1512 are formed in areas of the upper-body garment 1700 that typically experience stress forces compared to remaining areas of the upper-body garment 1700. Have a greater density of bonding structures 1512 in these areas helps to reduce the chances that the first web of fibers 1212 may come detached from the second web of fibers 1216. For example, with respect to the upper-body garment 1700, areas that may typically experience higher stress forces, include, for example, the upper back which may be subject to stress forces or tension forces when the wearer reaches their arms forward, areas along the sleeve seams, areas adjacent to the front closure mechanism, and the like. In some example aspects, the areas having a greater density of bonding structures 1512 may be based on a particular sport for which the upper-body garment 1700 is designed. In one example where the sport is running, a greater density of bonding structures 1512 may be formed along the mid to upper back as these areas may experience a relatively higher amount of stress forces due to a wearer's arm movements when running.

FIG. 18 depicts an example lower-body garment 1800 in the form of a pant. Although shown as a pant, aspects herein contemplate that the lower-body garment 1800 may be in the form of a tight, a capri, a short, a skirt, a unitard, and the like. The lower-body garment 1800 includes a torso portion 1810 that defines a waist opening 1812. A first leg portion 1814 and a second leg portion 1816 extend from the torso portion 1810 and respectively terminate in a first leg opening 1818 and a second leg opening 1820.

In example aspects, the first face 1232 of the composite nonwoven textile 1226 forms an outer-facing surface 1822 of the garment 1800, and in example aspects may form an outermost-facing surface of the garment 1800. In this example, the second face 1234 forms an inner-facing surface (not shown) of the garment 1800, and in example aspects, may form an innermost-facing surface of the garment 1800. An enlarged view of the first face 1232 of the composite nonwoven textile 1226 is shown with the second fibers 1218. Aspects herein also contemplate that the second face 1234 forms the outer-facing surface of the garment 1800, and the first face 1232 forms the inner-facing surface of the garment 1800.

Aspects herein contemplate adjusting parameters associated with a laser, such as the laser 1222, so that a greater density of bonding structures 1512 are formed in areas of the lower-body garment 1800 that typically experience stress forces compared to remaining areas of the lower-body garment 1800. Have a greater density of bonding structures 1512 in these areas helps to reduce the chances that the first web of fibers 1212 may come detached from the second web of fibers 1216. For example, with respect to the lower-body garment 1800, areas that may typically experience higher stress forces, include, for example, the buttocks, groin and front thigh areas which may be subject to stress forces or tension forces when the wearer sits down and/or raises their legs. In some example aspects, the areas having a greater density of bonding structures 1512 may be based on a particular sport for which the lower-body garment 1800 is designed. In one example where the sport is baseball and/or softball, a greater density of bonding structures 1512 may be formed along the waist opening area as this area may experience a relatively higher amount of stress forces due to rotation of the wearer's torso when swinging the bat.

FIG. 19 depicts an upper 1900 for an article of footwear 1910. The article of footwear 1910 may encompass any type of articles of footwear including athletic shoes, sandals, fashion shoes (men and women), and the like. In the example shown in FIG. 19, the first face 1232 of the composite nonwoven textile 1226 forms an outer-facing surface 1912 of the upper 1900, and in example aspects may form an outermost-facing surface of the upper 1900. In this example, the second face 1234 forms an inner-facing surface (not shown) of the upper 1900, and in example aspects, may form an innermost-facing surface of the upper 1900. An enlarged view of the first face 1232 of the composite nonwoven textile 1226 is shown with the second fibers 1218. Aspects herein also contemplate that the second face 1234 forms the outer-facing surface of the upper 1900, and the first face 1232 forms the inner-facing surface of the upper 1900.

Aspects herein contemplate adjusting parameters associated with a laser, such as the laser 1222, so that a greater density of bonding structures 1512 are formed in areas of the upper 1900 that typically experience higher stress forces compared to remaining areas of the upper 1900. Have a greater density of bonding structures 1512 in these areas helps to reduce the chances that the first web of fibers 1212 may come detached from the second web of fibers 1216. For example, with respect to the upper 1900, areas that may typically experience higher stress forces, include, for example, the ankle collar that is stretched when the wearer inserts their foot into the upper 1900. In some example aspects, the areas having a greater density of bonding structures 1512 may be based on a particular sport for which the upper 1900 is designed. In one example where the sport ballet, there may an increased density of bonding structures 1512 at areas from which the ballet straps extend.

Figure 20:
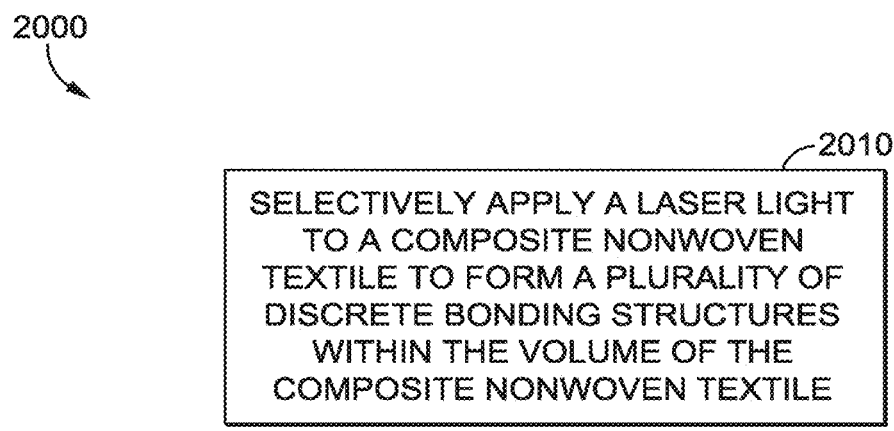
FIG. 20 illustrates a flow diagram of an example method of forming a composite nonwoven textile using laser bonding in accordance with aspects herein.

FIG. 20 depicts a flow diagram of an example method of forming a composite nonwoven textile, such as the composite nonwoven textile 1226, and is referenced generally by the numeral 2000. Like the composite nonwoven textile 1226, the composite nonwoven textile in the method 2000 includes a first web of fibers, such as the first web of fibers 1212 and a second web of fibers, such as the second web of fibers 1216. The first web of fibers comprises first fibers, such as the first fibers 1214 that have a first propensity to absorb electromagnetic radiation of a specified wavelength or wavelength range. The second web of fibers comprises second fibers such as the second fibers 1218 that have a second propensity to absorb the electromagnetic radiation that is lower than the first propensity. The second web of fibers forms a first face, such as the first face 1232 of the composite nonwoven textile, and the first web of fibers forms a second face, such as the second face 1234 of the composite nonwoven textile. In example aspects, one or more of the first fibers and the second fibers comprise a polymer material.

At a step 2010, electromagnetic radiation of the specified wavelength or wavelength range is selectively applied to the composite nonwoven textile by a laser, such as the laser 1222 to form a plurality of discrete bonding structures such as the bonding structure 1512. Parameters associated with the laser may be adjusted such that the bonding structures are located within the volume of the composite nonwoven textile and are generally positioned at the interface, such as the interface 1224 between the first face and the second face. Each of the bonding structures includes one or more amorphous polymer agglomerates formed from the first fibers where the agglomerate encapsulates or partially encapsulates neighboring fibers such as one or more of the first fibers and/or the second fibers to form the bond structure. At least the second fibers in the bonding structure maintain their fiber form. The bonding structures help to affix the first and second webs of fibers together. This is accomplished while maintaining the surface characteristics of the first face and the second face of the composite nonwoven textile since the electromagnetic radiation generally passes through the first face without affecting the second fibers present in the second web of fibers.

The use of laser bonding on nonwoven textiles may be used in additional ways in accordance with aspects herein. For example, FIG. 21 depicts a nonwoven textile 2100 which may be the nonwoven textile 118 or the composite nonwoven textile 1226. The nonwoven textile 2100 may be formed of first fibers, such as first fibers 2105 (shown in solid line) that have a first propensity to absorb electromagnetic radiation of a specified wavelength or wavelength range and second fibers, such as second fibers 2107 (shown in dashed line) that have a second propensity to absorb the electromagnetic radiation, where the second propensity is lower than the first propensity. The first and second fibers 2105 and 2107 may be mixed or entangled with each other such as described with respect to the nonwoven textile 118. Alternatively or additionally, the first and second fibers 2105 and 2107 may be in different fiber webs as described with respect to the composite nonwoven textile 1226. The first and second fibers 2105 and 2107 may be any of the fibers described herein including bicomponent fibers such as bicomponent fiber 600.

In example aspects, laser bonding may be used to create markings 2112 on a face 2113 of the nonwoven textile 2100 to delineate pattern pieces such as pattern pieces 2114 for sleeves, pattern piece 2116 for an upper for an article of footwear, and pattern piece 2118 for a torso and leg portion of a lower-body garment. The pattern pieces 2114, 2116, and 2118 may be removed from the nonwoven textile 2100 using removal technologies known in the art such as cutting, die cutting, water jet cutting, laser cutting, and the like.

The markings 2112 in one example aspect may comprise dimples or depressions in the face 2113 of the nonwoven textile 2100 such as the dimples 1230 described with respect to the composite nonwoven textile 1226. As described, dimples may also be formed in the nonwoven textile 118 when the first fibers 112 are entangled, when the second fibers 114 are entangled, or when the first fibers 112 are entangled with the second fibers 114. In another example aspect, the markings 2112 may comprise bonding structures present on the face 2113 of the nonwoven textile 2100. In this example aspect, the beam width may be increased such that visible bonding structures having an approximate diameter of from about 1 mm to about 5 mm may be formed on the face 2113 of the nonwoven textile 2100. In still other example aspects, and as described in greater detail with respect to FIG. 23, the nonwoven textile 2100 may include fibers that have been coated or impregnated with, for example, titanium dioxide ($TiO_2$) such that the fibers have a white color. The $TiO_2$ fibers may be positioned to be present on the face 2113. When exposed to the electromagnetic radiation from a laser, the $TiO_2$ fibers change color. In example aspects, this may be due to the degradation of the $TiO_2$ caused by the electromagnetic radiation. For instance, the color of the fibers changes from white to grey. Other example ways of creating pattern markings are contemplated as being within the scope herein.

Figure 22B:
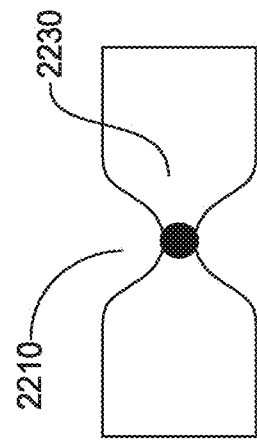
FIG. 22B illustrates an example cross-section of the pattern piece of FIG. 22A and depicts dimpling caused by a bonding structure in accordance with aspects herein.
Figure 22A:
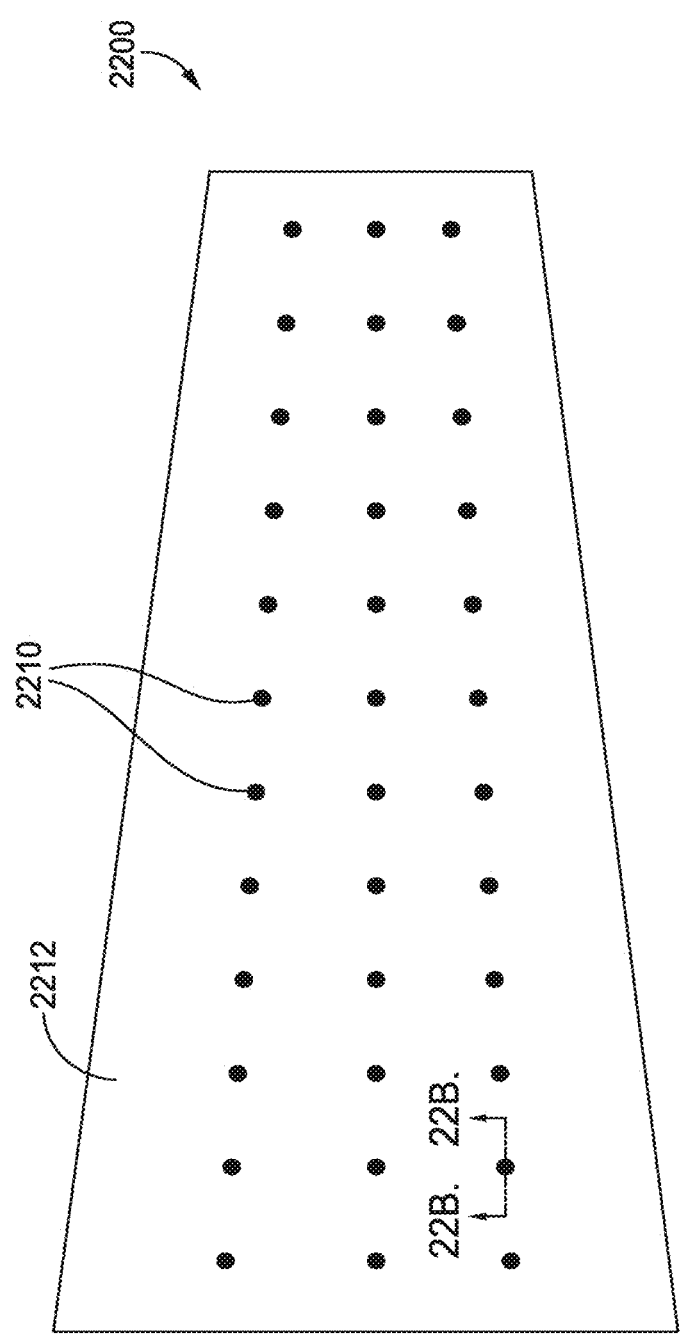
FIG. 22A illustrates an example pattern piece for a sleeve formed from a nonwoven textile where the pattern piece includes laser bonding sites to increase drapability in accordance with aspects herein.

FIG. 22A depicts the use of laser bonding to create fold or drape lines in a pattern piece, such as the pattern piece 2200 for a sleeve, or in an article of apparel formed from, for example, the nonwoven textile 118 or the composite nonwoven textile 1226. In one example aspect, and as described with respect to the composite nonwoven textile 1226, the bond structures formed by electromagnetic radiation emitted by a laser may causes dimples 2210, such as dimples 1230, in at least one face, such as face 2212 of the pattern piece 2200. FIG. 22B depicts a schematic of an example cross-section of one of the dimples 2210. As described with respect to the dimples 1230, the entrapment of fibers within a bonding structure such as the bonding structure 2230 may cause tension on adjacent fibers that are entangled with the entrapped fiber. In turn, this may cause dimpling on one or more of the faces where the dimples 2210 are axially aligned with the bonding structure 2230. The dimples 2210, whether on one or both faces of the textile, decrease a thickness of the textile compared to areas of the textile without the dimples 2210. Thus, the dimples may be strategically positioned on the pattern piece 2200 to create areas or "lines" of reduced thickness which may fold or bend easier than portions of the pattern piece 2200 without the dimples 2210.

Figure 23:
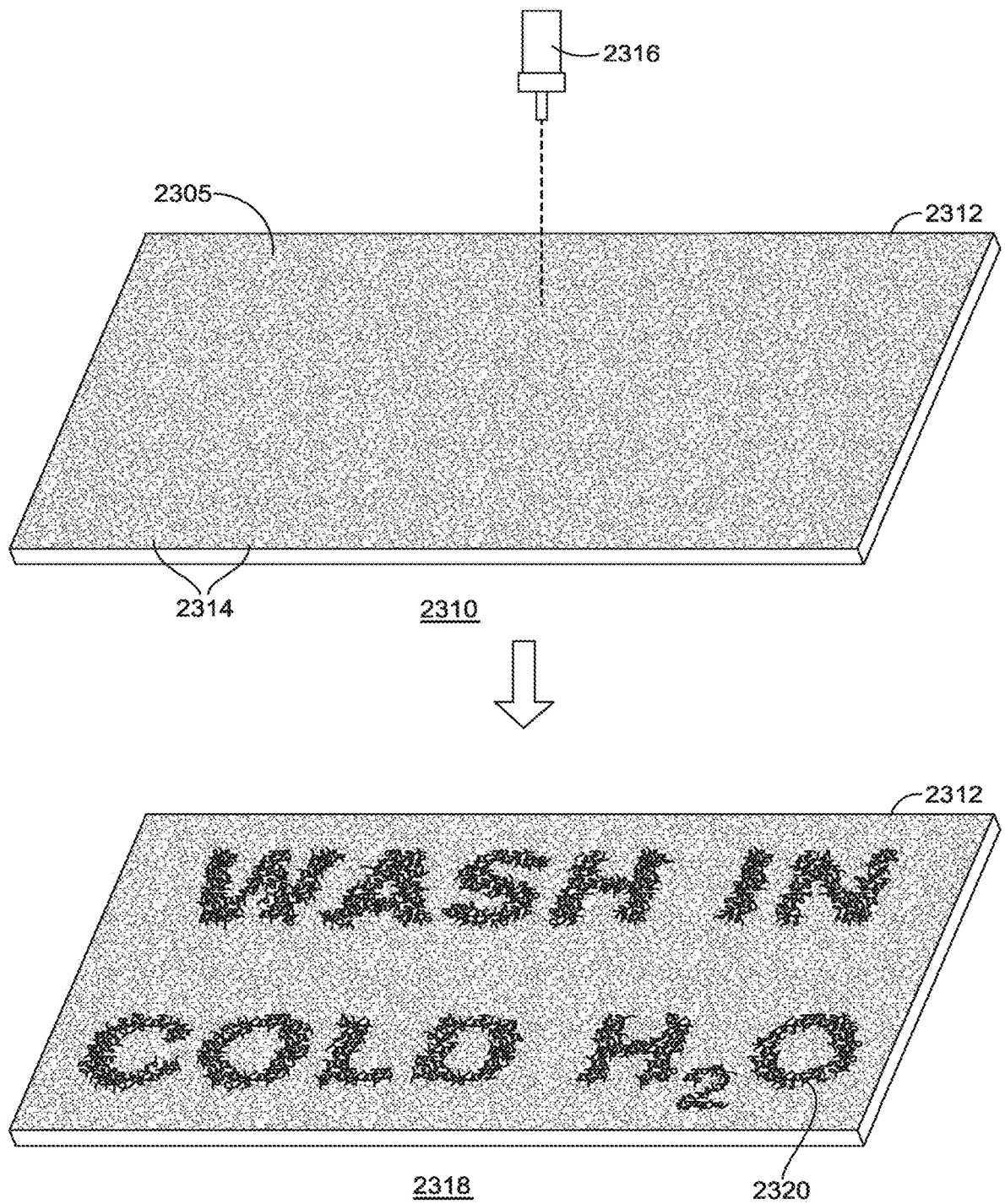
FIG. 23 illustrates a schematic of an example process of using fibers responsive to electromagnetic radiation emitted by a laser to form graphics, letters, and/or care instructions in accordance with aspects herein.

FIG. 23 depicts an example of using electromagnetic radiation emitted by a laser 2316 to create graphics, letters, logos, and the like on a nowoven textile 2312 such as the nonwoven textile 118 and/or the composite nonwoven textile 1226. In example aspects, the nonwoven textile 2312 may include $TiO_2$ fibers 2314 having a first color, such as white, where the fibers 2314 are present at least on a first face 2305 of the nonwoven textile 2312. At step 2310, electromagnetic radiation is selectively applied by the laser 2316 to the nonwoven textile 2312. The electromagnetic radiation may be applied in a programmed manner to create one or more of graphics, letters, logos, and the like. As stated above, the application of the electromagnetic radiation to the fibers 2314 causes them to change from a first color to a second color, such as grey.

At step 2318, letters, such as letter 2320 are depicted, where the letters 2320 are formed by the change in color of the fibers 2314 due to the programmed application of the electromagnetic radiation. In example aspects, this process may be used to form, for example, care instructions on a nonwoven textile used to form an article of apparel eliminating the need to attach extra fabric material containing the care instructions.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A nonwoven textile having a first face, an opposite second face, and a volume between the first face and the second face, the nonwoven textile comprising: a first plurality of fibers having a first propensity to absorb electromagnetic radiation emitted by a laser; a second plurality of fibers having a second propensity to absorb the electromagnetic radiation, the second propensity to absorb the electromagnetic radiation is lower than the first propensity to absorb the electromagnetic radiation, at least some of the second plurality of fibers are mixed with the first plurality of fibers, wherein fibers of at least one of the first plurality of fibers and the second plurality of fibers comprise a polymer, and a plurality of discrete bonding structures positioned between the first face and the second face of the nonwoven textile within the volume of the nonwoven textile, at least some of the plurality of discrete bonding structures including an amorphous polymer agglomerate and fibers from one or more of the first plurality of fibers and the second plurality of fibers in a fiber form, wherein portions of the fibers from the one or more of the first plurality of fibers and the second plurality of fibers are at least partially encapsulated by the amorphous polymer agglomerate.

Clause 2. The nonwoven textile according to clause 1, wherein the first plurality of fibers absorb the electromagnetic radiation and the second plurality of fibers do not absorb the electromagnetic radiation.

Clause 3. The nonwoven textile according to any of clauses 1 through 2, wherein there is a greater number of the second plurality of fibers per unit area at the first face relative to the second face.

Clause 4. The nonwoven textile according to any of clauses 1 through 3, wherein two or more fibers of the first plurality of fibers are in contact with two or more fibers of the second plurality of fibers within the volume of the nonwoven textile.

Clause 5. The nonwoven textile according to any of clauses 1 through 4, wherein a number of discrete bonding structures per unit area on the first face is less than a number of discrete bonding structures per unit area within the volume of the nonwoven textile.

Clause 6. The nonwoven textile according to any of clauses 1 through 5, wherein a number of discrete bonding structures per unit area on the second face is less than a number of discrete bonding structures per unit area within the volume of the nonwoven textile.

Clause 7. The nonwoven textile according to any of clauses 1 through 6, wherein one or more of the first plurality of fibers comprise bicomponent fibers with an electromagnetic radiation absorbing material positioned in a side-by-side relationship with a non-electromagnetic radiation absorbing material.

Clause 8. The nonwoven textile according to any of clauses 1 through 7, wherein the first plurality of fibers are entangled with the second plurality of fibers.

Clause 9. The nonwoven textile according to any of clauses 1 through 8, wherein a pilling resistance of at least the first face is at least 2 on the Martindale Pilling Test.

Clause 10. The nonwoven textile according to any of clauses 1 through 9, wherein a pilling resistance of at least the second face is at least 2 on the Martingdale Pilling Test.

Clause 11. The nonwoven textile according to any of clauses 1 through 10, wherein there is a non-homogenous distribution of the first plurality of fibers and the second plurality of fibers between the first face and the second face.

Clause 12. The nonwoven textile according to any of clauses 1 through 11, wherein there is one of a homogenous distribution or a non-homogenous distribution of the first plurality of fibers and the second plurality of fibers within the volume of the nonwoven textile.

Clause 13. The nonwoven textile according to any of clauses 1 through 12, wherein a staple length of one or more of the first plurality of fibers and the second plurality of fibers is from about 40 mm to about 120 mm.

Clause 14. An article of apparel comprising: a nonwoven textile having an outer-facing surface, an inner-facing surface, and a volume between the inner-facing surface and the outer-facing surface, the nonwoven textile comprising: a first plurality of fibers having a first propensity to absorb electromagnetic radiation emitted by a laser; a second plurality of fibers having a second propensity to absorb the electromagnetic radiation, the second propensity to absorb the electromagnetic radiation is lower than the first propensity to absorb the electromagnetic radiation, at least some of the second plurality of fibers are mixed with the first plurality of fibers, wherein fibers of at least one the first plurality of fibers and the second plurality of fibers comprise a polymer; and a plurality of discrete bonding structures positioned between the inner-facing surface and the outer-facing surface of the nonwoven textile within the volume of the nonwoven textile, at least some of the plurality of discrete bonding structures including an amorphous polymer agglomerate and fibers from one or more of the first plurality of fibers and the second plurality of fibers in a fiber form, wherein portions of the fibers from one or more of the first plurality of fibers and the second plurality of fibers are at least partially encapsulated by the amorphous polymer agglomerate.

Clause 15. The article of apparel according to clause 14, wherein the first plurality of fibers absorb the electromagnetic radiation and the second plurality of fibers do not absorb the electromagnetic radiation.

Clause 16. The article of apparel according to any of clauses 14 through 15, wherein there is a greater number of the second plurality of fibers per unit area at the outer-facing surface relative to the inner-facing surface.

Clause 17. The article of apparel according to any of clauses 14 through 16, wherein two or more fibers of the first plurality of fibers are in contact with two or more fibers of the second plurality of fibers within the volume of the nonwoven textile.

Clause 18. The article of apparel according to any of clauses 14 through 17, wherein a number of discrete bonding structures per unit area on the outer-facing surface of the nonwoven textile is less than a number of discrete bonding structures per unit area within the volume of the nonwoven textile.

Clause 19. The article of apparel according to any of clauses 14 through 18, wherein a number of discrete bonding structures per unit area on the inner-facing surface of the nonwoven textile is less than a number of discrete bonding structures per unit area within the volume of the nonwoven textile.

Clause 20. The article of apparel according to any of clauses 14 through 19, wherein one or more of the first plurality of fibers comprise bicomponent fibers with an electromagnetic radiation absorbing material positioned in a side-by-side relationship with a non-electromagnetic radiation absorbing material.

Clause 21. The article of apparel according to any of clauses 14 through 20, wherein the first plurality of fibers are entangled with the second plurality of fibers.

Clause 22. The article of apparel according to any of clauses 14 through 21, wherein a pilling resistance of at least the outer-facing surface is at least 2 on the Martindale Pilling Test.

Clause 23. The article of apparel according to any of clauses 14 through 22, wherein a pilling resistance of at least the inner-facing surface is at least 2 on the Martindale Pilling Test.

Clause 24. The article of apparel according to any of clauses 14 through 23, wherein there is a non-homogenous distribution of the first plurality of fibers and the second plurality of fibers between the outer-facing surface and the inner-facing surface of the nonwoven textile.

Clause 25. The article of apparel according to any of clauses 14 through 24, wherein there is one of a homogenous or a non-homogenous distribution of the first plurality of fibers and the second plurality of fibers within the volume of the nonwoven textile.

Clause 26. The article of apparel according to any of clauses 14 through 25, wherein a staple length of one or more of the first plurality of fibers and the second plurality of fibers is from about 40 mm to about 120 mm.

Clause 27. The article of apparel according to any of clauses 14 through 26, wherein the outer-facing surface of the nonwoven textile forms an outermost-facing surface of the article of apparel.

Clause 28. The article of apparel according to any of clauses 14 through 27, wherein the inner-facing surface of the nonwoven textile forms an innermost-facing surface of the article of apparel.

Clause 29. The article of apparel according to any of clauses 14 through 28, wherein the article of apparel comprises one of an upper-body garment, a lower-body garment, or an upper for an article of footwear.

Clause 30. A method of finishing a nonwoven textile having a first face, an opposite second face, and a volume between the first face and the opposite second face, the nonwoven textile comprising a first plurality of fibers having a first propensity to absorb electromagnetic radiation emitted by a laser, and a second plurality of fibers having a second propensity to absorb the electromagnetic radiation that is lower than the first propensity to absorb the electromagnetic radiation, wherein at least some of the second plurality of fibers are mixed with the first plurality of fibers, and wherein fibers of at least one of the first plurality of fibers and the second plurality of fibers comprise a polymer, the method comprising: selectively applying the electromagnetic radiation from a laser to the nonwoven textile to form a plurality of discrete bonding structures within the volume of the nonwoven textile, the plurality of discrete bonding structures positioned between the first face and the second face within the volume of the nonwoven textile, at least some of the plurality of discrete bonding structures including an amorphous polymer agglomerate and fibers from one or more of the first plurality of fibers and the second plurality of fibers in a fiber form, wherein portions of the fibers from one or more of the first plurality of fibers and the second plurality of fibers are at least partially encapsulated by the amorphous polymer agglomerate.

Clause 31. The method of finishing the nonwoven textile according to clause 30, wherein the selective application of the electromagnetic radiation from the laser causes portions of the first plurality of fibers to melt, and wherein after the selective application of the electromagnetic radiation from the laser ceases, the melted portions of the first plurality of fibers re-solidify to form the amorphous polymer agglomerate.

Clause 32. The method of finishing the nonwoven textile according to any of clauses 30 through 31, wherein the electromagnetic radiation is applied in a pattern comprising spaced-apart application sites.

Clause 33. The method of finishing the nonwoven textile according to any of clauses 30 through 32, wherein the first plurality of fibers absorb the electromagnetic radiation and the second plurality of fibers do not absorb the electromagnetic radiation.

Clause 34. The method of finishing the nonwoven textile according to any of clauses 30 through 33, wherein there is a greater number of the second plurality of fibers per unit area at the first face relative to the second face.

Clause 35. The method of finishing the nonwoven textile according to any of clauses 30 through 34, wherein two or more fibers of the first plurality of fibers are in contact with two or more fibers of the second plurality of fibers within the volume of the nonwoven textile.

Clause 36. The method of finishing the nonwoven textile according to any of clauses 30 through 35, wherein a number of discrete bonding structures per unit area on the first face is less than a number of discrete bonding structures per unit area within the volume of the nonwoven textile.

Clause 37. The method of finishing the nonwoven textile according to any of clauses 30 through 36, wherein a number of discrete bonding structures per unit area on the second face is less than a number of discrete bonding structures per unit area within the volume of the nonwoven textile.

Clause 38. The method of finishing the nonwoven textile according to any of clauses 30 through 37, wherein one or more of the first plurality of fibers comprise bicomponent fibers with an electromagnetic radiation absorbing material positioned in a side-by-side relationship with a non-electromagnetic radiation absorbing material.

Clause 39. The method of finishing the nonwoven textile according to any of clauses 30 through 38, wherein the first plurality of fibers are entangled with the second plurality of fibers.

Clause 40. The method of finishing the nonwoven textile according to any of clauses 30 through 39, wherein a pilling resistance of at least the first face is at least 2 on the Martindale Pilling Test.

Clause 41. The method of finishing the nonwoven textile according to any of clauses 30 through 40, wherein a pilling resistance of at least the second face is at least 2 on the Martingdale Pilling Test.

Clause 42. The method of finishing the nonwoven textile according to any of clauses 30 through 41, wherein there is a non-homogenous distribution of the first plurality of fibers and the second plurality of fibers between the first face and the second face.

Clause 43. The method of finishing the nonwoven textile according to any of clauses 30 through 42, wherein there is one of a homogenous or a non-homogenous distribution of the first plurality of fibers and the second plurality of fibers within the volume of the nonwoven textile.

Clause 44. The method of finishing the nonwoven textile according to any of clauses 30 through 43, wherein a staple length of one or more of the first plurality of fibers and the second plurality of fibers is from about 40 mm to about 120 mm.

Clause 45. A composite nonwoven textile having a first face an opposite second face, and a volume between the first face and the second face, the composite nonwoven textile comprising: a first web of fibers that forms the first face, the first web of fibers comprising first fibers having a first propensity to absorb electromagnetic radiation emitted by a laser; a second web of fibers that forms the second face, the second web of fibers comprising second fibers having a second propensity to absorb the electromagnetic radiation, the second propensity to absorb the electromagnetic radiation is lower than the first propensity to absorb the electromagnetic radiation, wherein fibers of at least one of the first fibers and the second fibers comprise a polymer; and a plurality of discrete bonding structures positioned between the first face and the second face of the composite nonwoven textile within the volume of the composite nonwoven textile, at least some of the plurality of discrete bonding structures including an amorphous polymer agglomerate and fibers from one or more of the first fibers and the second fibers in a fiber form, wherein portions of one or more of the first fibers and the second fibers are at least partially encapsulated by the amorphous polymer agglomerate.

Clause 46. The composite nonwoven textile according to clause 45, wherein the plurality of discrete bonding structures are located at an interface between the first web of fibers and the second web of fibers.

Clause 47. The composite nonwoven textile according to any of clauses 45 through 46, wherein the first fibers absorb the electromagnetic radiation and the second fibers do not absorb the electromagnetic radiation.

Clause 48. The composite nonwoven textile according to any of clauses 45 through 47, wherein two or more fibers of the first fibers are in contact with two or more fibers of the second fibers within the volume of the composite nonwoven textile.

Clause 49. The composite nonwoven textile according to any of clauses 45 through d48, wherein a number of discrete bonding structures per unit area on the first face is less than a number of discrete bonding structures per unit area within the volume of the composite nonwoven textile.

Clause 50. The composite nonwoven textile according to any of clauses 45 through 49, wherein the number of discrete bonding structures per unit area on the first face is zero.

Clause 51. The composite nonwoven textile according to any of clauses 45 through 50, wherein a number of discrete bonding structures per unit area on the second face is less than a number of discrete bonding structures per unit area within the volume of the composite nonwoven textile.

Clause 52. The composite nonwoven textile according to any of clauses 45 through 51, wherein the number of discrete bonding structures per unit area on the second face is zero.

Clause 53. The composite nonwoven textile according to any of clauses 45 through 52, wherein one or more of the first fibers comprise bicomponent fibers with an electromagnetic radiation absorbing material positioned in a side-by-side relationship with a non-electromagnetic radiation absorbing material.

Clause 54. The composite nonwoven textile according to any of clauses 45 through 53, wherein the first web of fibers comprises a first entangled web of fibers.

Clause 55. The composite nonwoven textile according to any of clauses 45 through 54, wherein the second web of fibers comprises a second entangled web of fibers.

Clause 56. An article of apparel comprising: a composite nonwoven textile having a first face, an opposite second face, and a volume between the first face and the second face, the composite nonwoven textile comprising: a first web of fibers that forms the first face, the first web of fibers comprising first fibers having a first propensity to absorb electromagnetic radiation emitted by a laser, a second web of fibers that forms the second the face, the second web of fibers comprising second fibers having a second propensity to absorb the electromagnetic radiation, the second propensity to absorb the electromagnetic radiation is lower than the first propensity to absorb the electromagnetic radiation, wherein fibers of at least one of the first fibers and the second fibers comprise a polymer; and a plurality of discrete bonding structures positioned between the first face and the second face of the composite nonwoven textile within the volume of the composite nonwoven textile, at least some of the plurality of discrete bonding structures including an amorphous polymer agglomerate and fibers from one or more of the first fibers and the second fibers in a fiber form, wherein portions of one or more of the first fibers and the second fibers are at least partially encapsulated by the amorphous polymer agglomerate.

Clause 57. The article of apparel according to clause 56, wherein the first face of the composite nonwoven textile forms an outermost-facing surface of the article of apparel.

Clause 58. The article of apparel according to any of clauses 56 through 57, wherein the second face of the composite nonwoven textile forms an innermost-facing surface of the article of apparel.

Clause 59. The article of apparel according to any of clauses 56 through 58, wherein the article of apparel is one of an upper-body garment, a lower-body garment, or an upper for an article of footwear.

Clause 60. The article of apparel according to any of clauses 56 through 59, wherein the plurality of discrete bonding structures are located at an interface between the first web of fibers and the second web of fibers.

Clause 61. The article of apparel according to any of clauses 56 through 60, wherein the first fibers absorb the electromagnetic radiation and the second fibers do not absorb the electromagnetic radiation.

Clause 62. The article of apparel according to any of clauses 56 through 61, wherein two or more fibers of the first fibers are in contact with two or more fibers of the second fibers within the volume of the composite nonwoven textile.

Clause 63. The article of apparel according to any of clauses 56 through 62, wherein a number of discrete bonding structures per unit area on the first face is less than a number of discrete bonding structures per unit area within the volume of the composite nonwoven textile.

Clause 64. The article of apparel according to any of clauses 56 through 63, wherein the number of discrete bonding structures per unit area on the first face is zero.

Clause 65. The article of apparel according to any of clauses 56 through 64, wherein a number of discrete bonding structures per unit area on the second face is less than a number of discrete bonding structures per unit area within the volume of the composite nonwoven textile.

Clause 66. The article of apparel according to any of clauses 56 through 65, wherein the number of discrete bonding structures per unit area on the second face is zero.

Clause 67. The article of apparel according to any of clauses 56 through 66, wherein one or more of the first fibers comprise bicomponent fibers with an electromagnetic radiation absorbing material positioned in a side-by-side relationship with a non-electromagnetic radiation absorbing material.

Clause 68. The article of apparel according to any of clauses 56 through 67, wherein the first web of fibers comprises a first entangled web of fibers.

Clause 69. The article of apparel according to any of clauses 56 through 68, wherein the second web of fibers comprises a second entangled web of fibers.

Clause 70. A method of forming a composite nonwoven textile comprising a first web of fibers comprising first fibers with a first propensity for absorbing electromagnetic radiation emitted by a laser, and a second web of fibers comprising second fibers with a second propensity for absorbing the electromagnetic radiation, the second propensity is lower than the first propensity, the first web of fibers and the second web of fibers forming a first face and an opposite second face of the composite nonwoven textile and a volume between the first face and the second face, wherein fibers from at least one of the first fibers and the second fibers comprise a polymer, the method comprising: selectively applying the electromagnetic radiation using the laser to the composite nonwoven textile to form a plurality of discrete bonding structures, the plurality of discrete bonding structures positioned between the first face and the second face within the volume of the composite nonwoven textile, at least some of the plurality of discrete bonding structures including an amorphous polymer agglomerate and fibers from one or more of the first fibers and the second fibers in a fiber form, wherein portions of one or more of the first fibers and the second fibers are at least partially encapsulated by the amorphous polymer agglomerate.

Clause 71. The method of forming the composite nonwoven textile according to clause 70, wherein the selective application of the electromagnetic radiation using the laser causes portions of the first fibers to melt, and wherein after the selective application of the electromagnetic radiation from the laser ceases, the melted portions of the first fibers re-solidify to form the amorphous polymer agglomerate.

Clause 72. The method of forming the composite nonwoven textile according to any of clauses 70 through 71, wherein the electromagnetic radiation is applied in a pattern comprising spaced-apart application sites.

Clause 73. The method of forming the composite nonwoven textile according to any of clauses 70 through 72, wherein the plurality of discrete bonding structures are located at an interface between the first web of fibers and the second web of fibers.

Clause 74. The method of forming the composite nonwoven textile according to any of clauses 70 through 73, wherein the first fibers absorb the electromagnetic radiation and the second fibers do not absorb the electromagnetic radiation.

Clause 75. The method of forming the composite nonwoven textile according to any of clauses 70 through 74, wherein two or more fibers of the first fibers are in contact with two or more fibers of the second fibers within the volume of the composite nonwoven textile.

Clause 76. The method of forming the composite nonwoven textile according to any of clauses 70 through 75, wherein a number of discrete bonding structures per unit area on the first face is less than a number of discrete bonding structures per unit area within the volume of the composite nonwoven textile.

Clause 77. The method of forming the composite nonwoven textile according to any of clauses 70 through 76, wherein the number of discrete bonding structures per unit area on the first face is zero.

Clause 78. The method of forming the composite nonwoven textile according to any of clauses 70 through 77, wherein a number of discrete bonding structures per unit area on the second face is less than a number of discrete bonding structures per unit area within the volume of the composite nonwoven textile.

Clause 79. The method of forming the composite nonwoven textile according to any of clauses 70 through 78, wherein the number of discrete bonding structures per unit area on the second face is zero.

Clause 80. The method of forming the composite nonwoven textile according to any of clauses 70 through 79, wherein one or more of the first fibers comprise bicomponent fibers with an electromagnetic radiation absorbing material positioned in a side-by-side relationship with a non-electromagnetic radiation absorbing material.

Clause 81. The method of forming the composite nonwoven textile according to any of clauses 70 through 80, wherein the first web of fibers comprises a first entangled web of fibers.

Clause 82. The method of forming the composite nonwoven textile according to any of clauses 70 through 81, wherein the second web of fibers comprises a second entangled web of fibers.

Clause 83. A nonwoven textile having a first face, and an opposite second face, the nonwoven textile comprising: a first plurality of fibers comprising titanium dioxide, the first plurality of fibers at least partially forming the first face of the nonwoven textile, wherein a first subset of the first plurality of fibers on the first face comprises a first color, and wherein a second subset of the first plurality of fibers on the first face comprises a second color different from the first color.

Clause 84. The nonwoven textile of clause 82, wherein the second subset of the first plurality of fibers forms one or more of a letter, a logo, and a graphic on the first face of the nonwoven textile.

Clause 85. The nonwoven textile according to clause 84, wherein the second subset of the first plurality of fibers forms letters that specify care instructions.

Clause 86. An article of apparel formed from the nonwoven textile according to any of clauses 83 through 85.

Clause 87. The article of apparel according to clause 86, wherein the article of apparel comprises one of an upper-body garment, a lower-body garment, or an upper for an article of footwear.

Clause 89. A method of finishing a nonwoven textile comprising a first face, and an opposite second face, and a first plurality of fibers at least partially forming the first face of the nonwoven textile, wherein the first plurality of fibers comprises a first color, the method comprising: selectively applying electromagnetic radiation of a specified wavelength or wavelength range to the first face of the nonwoven textile, wherein the application of the electromagnetic radiation causes at least a subset of the first plurality of fibers to change from the first color to a second color, the second color different from the first color.

Clause 90. The method of finishing the nonwoven textile of clause 89, wherein the subset of the first plurality of fibers forms one or more of a letter, a graphic, and a logo.

Clause 91. The method of finishing the nonwoven textile according to any of clauses 89 through 90, wherein the first plurality of fibers comprise titanium dioxide.

Clause 92. A method of marking pattern pieces on a nonwoven textile comprising a first face, an opposite second face, and a volume between the first face and the opposite second face, the nonwoven textile comprising a first plurality of fibers having a first propensity to absorb electromagnetic radiation emitted by a laser and a second plurality of fibers having a second propensity to absorb the electromagnetic radiation, the second propensity is lower than the first propensity, one or more of the first plurality of fibers and the second plurality of fibers comprising a polymer, the method comprising: using a laser to selectively apply the electromagnetic radiation to the first face of the nonwoven textile in an application pattern that defines a perimeter shape of a pattern piece for one or more of an upper-body garment, a lower-body garment, and an upper for an article of footwear, wherein the application pattern comprises spaced-apart application sites.

Clause 93. The method of marking pattern pieces on the nonwoven textile according to clause 92, further comprising excising one or more of the pattern pieces from the nonwoven textile.

Clause 94. The method of marking pattern pieces on the nonwoven textile according to any of clauses 92 through 93, wherein one or more discrete bonding structures are formed at the application sites, at least some of the one or more discrete bonding structures including an amorphous polymer agglomerate and fibers from one or more of the first plurality of fibers and the second plurality of fibers in a fiber form, wherein portions of the fibers from the one or more of the first plurality of fibers and the second plurality of fibers are at least partially encapsulated by the amorphous polymer agglomerate.

Clause 95. A pattern piece formed by the method according to any of clauses 92 through 94.

Clause 96. An article of apparel formed from a nonwoven textile having an outer-facing surface, an inner-facing surface, and a volume between the inner-facing surface and the outer-facing surface, the nonwoven textile comprising a first plurality of fibers having a first propensity to absorb electromagnetic radiation emitted by a laser; a second plurality of fibers having a second propensity to absorb the electromagnetic radiation, the second propensity to absorb the electromagnetic radiation is lower than the first propensity to absorb the electromagnetic radiation, at least some of the second plurality of fibers are entangled with the first plurality of fibers, wherein fibers of at least one the first plurality of fibers and the second plurality of fibers comprise a polymer, a plurality of discrete bonding structures positioned between the inner-facing surface and the outer-facing surface of the nonwoven textile within the volume of the nonwoven textile, at least some of the plurality of discrete bonding structures including an amorphous polymer agglomerate and fibers from one or more of the first plurality of fibers and the second plurality of fibers in a fiber form, wherein portions of the fibers from one or more of the first plurality of fibers and the second plurality of fibers are at least partially encapsulated by the amorphous polymer agglomerate; and a plurality of dimples formed in one or more of the first face and the second face, each of the plurality of dimples axially aligned with a bonding structure of the plurality of discrete bonding structures.

Clause 97. The article of apparel according to clause 96, wherein the plurality of dimples are arranged in a pattern to form one or more fold lines along which the stiffness of the nonwoven textile is reduced.

Clause 98. The article of apparel according to any of clauses 96 through 97, wherein one or more fibers located in one or more of the plurality of dimples are entangled with one or more of the first plurality of fibers and the second plurality of fibers located within the bonding structure.

Clause 99. The article of apparel according to any of clauses 96 through 98, wherein each dimple of the plurality of dimples is offset inwardly from a surface plane defined by one or more of the first face and the second face.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. An article of apparel comprising:
   a nonwoven textile having an outer-facing surface that comprises an outermost-facing surface of the apparel article, an inner-facing surface that comprises an innermost-facing surface of the article of apparel, and a volume between the inner-facing surface and the outer-facing surface, the nonwoven textile comprising:
   a first plurality of fibers having a first propensity to absorb electromagnetic radiation emitted by a laser;
   a second plurality of fibers having a second propensity to absorb the electromagnetic radiation, the second propensity to absorb the electromagnetic radiation is lower than the first propensity to absorb the electromagnetic radiation, at least some of the second plurality of fibers are mixed with the first plurality of fibers, wherein fibers of at least one the first plurality of fibers and the second plurality of fibers comprise a polymer; and
   a plurality of discrete bonding structures positioned between the inner-facing surface and the outer-facing surface of the nonwoven textile within the volume of the nonwoven textile, at least some of the plurality of discrete bonding structures including an amorphous polymer agglomerate and fibers from one or more of the first plurality of fibers and the second plurality of fibers in a fiber form, wherein portions of the fibers from one or more of the first plurality of fibers and the second plurality of fibers are at least partially encapsulated by the amorphous polymer agglomerate.

2. The article of apparel of claim 1, wherein the first plurality of fibers absorb the electromagnetic radiation and the second plurality of fibers do not absorb the electromagnetic radiation.

3. The article of apparel of claim 1, wherein there is a greater number of the second plurality of fibers per unit area at the outer-facing surface relative to the inner-facing surface.

4. The article of apparel of claim 1, wherein a number of discrete bonding structures per unit area on the outer-facing surface or on the inner-facing surface of the nonwoven textile is less than a number of discrete bonding structures per unit area within the volume of the nonwoven textile.

5. The article of apparel of claim 1, wherein the volume comprises a non-homogenous distribution of the first plurality of fibers and the second plurality of fibers between the outer-facing surface and the inner-facing surface of the nonwoven textile.

6. The article of apparel of claim 1, wherein the article of apparel comprises one of an upper-body garment, a lower-body garment, or an upper for an article of footwear.

7. The article of apparel of claim 1, wherein the fibers of at least one the first plurality of fibers and the second plurality of fibers comprise recycled PET.

8. The article of apparel of claim 7, wherein the recycled PET fibers comprise shredded PET fibers derived from shredded articles.

9. The article of apparel of claim 7, wherein the recycled PET fibers comprise re-extruded PET fibers.

* * * * *